(12) United States Patent
Cretti

(10) Patent No.: US 8,936,453 B2
(45) Date of Patent: Jan. 20, 2015

(54) APPARATUS AND METHOD FOR CONTINUOUSLY FORMING AN ELEMENT MADE OF EXPANDED PLASTIC MATERIAL AND CONSTRUCTION ELEMENT

(75) Inventor: Piero Cretti, Morbio Superiore (CH)

(73) Assignee: Gilanberry Trading Ltd., Nicosia (CY)

( * ) Notice: Subject to any disclaimer, the term of this patent is extended or adjusted under 35 U.S.C. 154(b) by 451 days.

(21) Appl. No.: 12/666,399

(22) PCT Filed: Jun. 25, 2008

(86) PCT No.: PCT/IB2008/001740
§ 371 (c)(1),
(2), (4) Date: Feb. 15, 2010

(87) PCT Pub. No.: WO2009/001213
PCT Pub. Date: Dec. 31, 2008

(65) Prior Publication Data
US 2010/0159199 A1    Jun. 24, 2010

(30) Foreign Application Priority Data

Jun. 26, 2007 (IT) .............................. MI2007A1281

(51) Int. Cl.
B29C 44/30 (2006.01)
B29C 44/46 (2006.01)
B29C 44/20 (2006.01)

(52) U.S. Cl.
CPC ............. B29C 44/304 (2013.01); B29C 44/206 (2013.01)
USPC ........ 425/4 C; 425/817 C; 425/125; 425/330; 425/371; 425/505

(58) Field of Classification Search
CPC ...... B29C 44/28; B29C 44/285; B29C 44/30; B29C 44/302; B29C 44/304; B29C 44/306
USPC ...... 425/4 R, 4 C, 335, 336, 364 R, 371, 505, 425/508, 516, 817 R, 817 C, 125, 330
See application file for complete search history.

(56) References Cited

U.S. PATENT DOCUMENTS 2,310,457 A  *  2/1943  Owen .............................. 65/144
3,065,500 A  *  11/1962  Berner .......................... 425/4 R
(Continued)

FOREIGN PATENT DOCUMENTS

DE          2605198 A1    8/1977
EP          1120218 A1    8/2001
(Continued)

OTHER PUBLICATIONS

Chinese Office Action Dated May 30, 2012.
(Continued)

*Primary Examiner* — Seyed Masoud Malekzadeh
(74) *Attorney, Agent, or Firm* — Husch Blackwell LLP

(57) ABSTRACT

An apparatus for continuously forming a continuous element made of expanded plastic material comprises: a loading section of a mass of granules made of expandable plastic material; a sintering section of the continuous element made of expanded plastic material extending downstream of the loading section; a stabilizing section of the continuous element made of expanded plastic material extending downstream of the sintering section; a forming tunnel extending along the sintering and stabilizing sections and defined between a pair of lateral walls and a pair of gas permeable conveyor belts, supported by respective supporting tracks. Further, at least one of the supporting tracks of the gas permeable conveyor belts comprises at least one portion extending in the sintering section and angularly tiltable with respect to a transversal centerline plane ($\pi$) of the forming tunnel for varying the height of the tunnel in a longitudinal direction.

20 Claims, 12 Drawing Sheets

(56) References Cited

U.S. PATENT DOCUMENTS

| | | | | |
|---|---|---|---|---|
| 3,178,768 | A | * | 4/1965 | Edberg ........................ 425/4 R |
| 3,240,846 | A | | 3/1966 | Voelker |
| 3,258,513 | A | * | 6/1966 | Berry et al. .................... 264/112 |
| 3,383,441 | A | * | 5/1968 | Norrhede et al. ............... 264/51 |
| 3,408,690 | A | * | 11/1968 | Jacob ........................ 425/4 R |
| 3,422,178 | A | | 1/1969 | Junker et al. |
| 3,552,259 | A | * | 1/1971 | Griffith ........................ 86/20.1 |
| 3,562,767 | A | | 2/1971 | Mallet et al. |
| 3,579,722 | A | | 5/1971 | Schmidt et al. |
| 3,608,028 | A | | 9/1971 | Paymal |
| 3,704,872 | A | * | 12/1972 | Klein ........................... 432/59 |
| 3,726,624 | A | * | 4/1973 | Schwarz ...................... 425/145 |
| 3,734,668 | A | * | 5/1973 | Porter ......................... 425/330 |
| 3,736,081 | A | * | 5/1973 | Yovanovich .................. 425/4 C |
| 3,736,082 | A | * | 5/1973 | Wick et al. ................... 425/4 C |
| 3,767,744 | A | * | 10/1973 | Holl ............................. 264/51 |
| 3,914,080 | A | * | 10/1975 | Kamp ......................... 425/83.1 |
| 3,986,918 | A | * | 10/1976 | Berner ........................ 156/497 |
| 3,992,501 | A | * | 11/1976 | Tatzel et al. .................. 264/126 |
| 4,008,030 | A | * | 2/1977 | Ampler ........................ 425/224 |
| 4,067,672 | A | * | 1/1978 | Korpela et al. ............... 425/4 C |
| 4,104,060 | A | * | 8/1978 | Johnson ........................ 419/3 |
| 4,174,415 | A | * | 11/1979 | Bethe .......................... 428/90 |
| 4,181,696 | A | * | 1/1980 | Mayrl .......................... 264/166 |
| 4,216,177 | A | * | 8/1980 | Otto ............................ 264/415 |
| 4,278,624 | A | * | 7/1981 | Kornylak ..................... 264/37.16 |
| 4,279,847 | A | * | 7/1981 | Assarsson et al. ............. 264/51 |
| 4,382,758 | A | * | 5/1983 | Nopper et al. ................. 425/82.1 |
| 4,422,988 | A | * | 12/1983 | Kornylak ..................... 264/40.3 |
| 4,432,713 | A | | 2/1984 | Berner |
| 4,607,061 | A | * | 8/1986 | Schmidt ....................... 521/122 |
| 4,756,859 | A | * | 7/1988 | Cretti .......................... 264/45.4 |
| 4,802,837 | A | * | 2/1989 | Held ............................ 425/230 |
| 4,895,508 | A | * | 1/1990 | Held ............................ 425/371 |
| 4,927,699 | A | * | 5/1990 | Melcher ....................... 428/203 |
| 5,151,228 | A | * | 9/1992 | Vahlbrauk .................... 264/42 |
| 5,458,477 | A | * | 10/1995 | Kemerer et al. ............... 425/371 |
| 5,460,497 | A | * | 10/1995 | Vismara ....................... 425/4 R |
| 5,505,599 | A | * | 4/1996 | Kemerer et al. ............... 425/4 C |
| 5,700,495 | A | * | 12/1997 | Kemerer et al. ............... 425/190 |
| 5,792,481 | A | * | 8/1998 | Cretti .......................... 425/4 C |
| 6,005,014 | A | * | 12/1999 | Blackwell et al. ............. 521/79 |
| 6,045,350 | A | * | 4/2000 | Cretti .......................... 425/364 R |
| 6,520,759 | B2 | * | 2/2003 | Kitayama et al. .............. 425/4 C |
| 6,537,054 | B2 | * | 3/2003 | Kitahama et al. .............. 425/224 |
| 6,565,689 | B2 | * | 5/2003 | Geib et al. .................... 156/137 |
| 6,627,025 | B1 | * | 9/2003 | Yu ............................... 156/167 |
| 7,316,559 | B2 | * | 1/2008 | Taylor ......................... 425/371 |
| 7,651,645 | B2 | * | 1/2010 | Taylor ......................... 264/46.2 |
| 2002/0048614 | A1 | * | 4/2002 | Kitayama et al. .............. 425/4 C |
| 2004/0227265 | A1 | * | 11/2004 | Nishida et al. ................ 264/29.1 |
| 2005/0287238 | A1 | * | 12/2005 | Taylor ......................... 425/371 |
| 2006/0043629 | A1 | * | 3/2006 | Drzal et al. ................... 264/140 |
| 2011/0266717 | A1 | * | 11/2011 | Nehls et al. ................... 264/413 |

FOREIGN PATENT DOCUMENTS

| | | | |
|---|---|---|---|
| FR | 2861638 | A1 | 5/2005 |
| GB | 1073253 | A | 6/1967 |
| JP | 49053262 | A | 5/1974 |
| JP | 50134075 | A | 10/1975 |
| JP | 10058476 | A | 3/1998 |
| JP | 2000006253 | A | 1/2000 |
| JP | 2001-198939 | A | 7/2001 |
| JP | 2001300965 | A | 10/2001 |
| JP | 2002240073 | A | 8/2002 |
| JP | 2002-292742 | A | 10/2002 |

OTHER PUBLICATIONS

Japanese Office Action dated Oct. 30, 2012.
Korean Office Action dated Apr. 9, 2014 from corresponding Korean application.

* cited by examiner

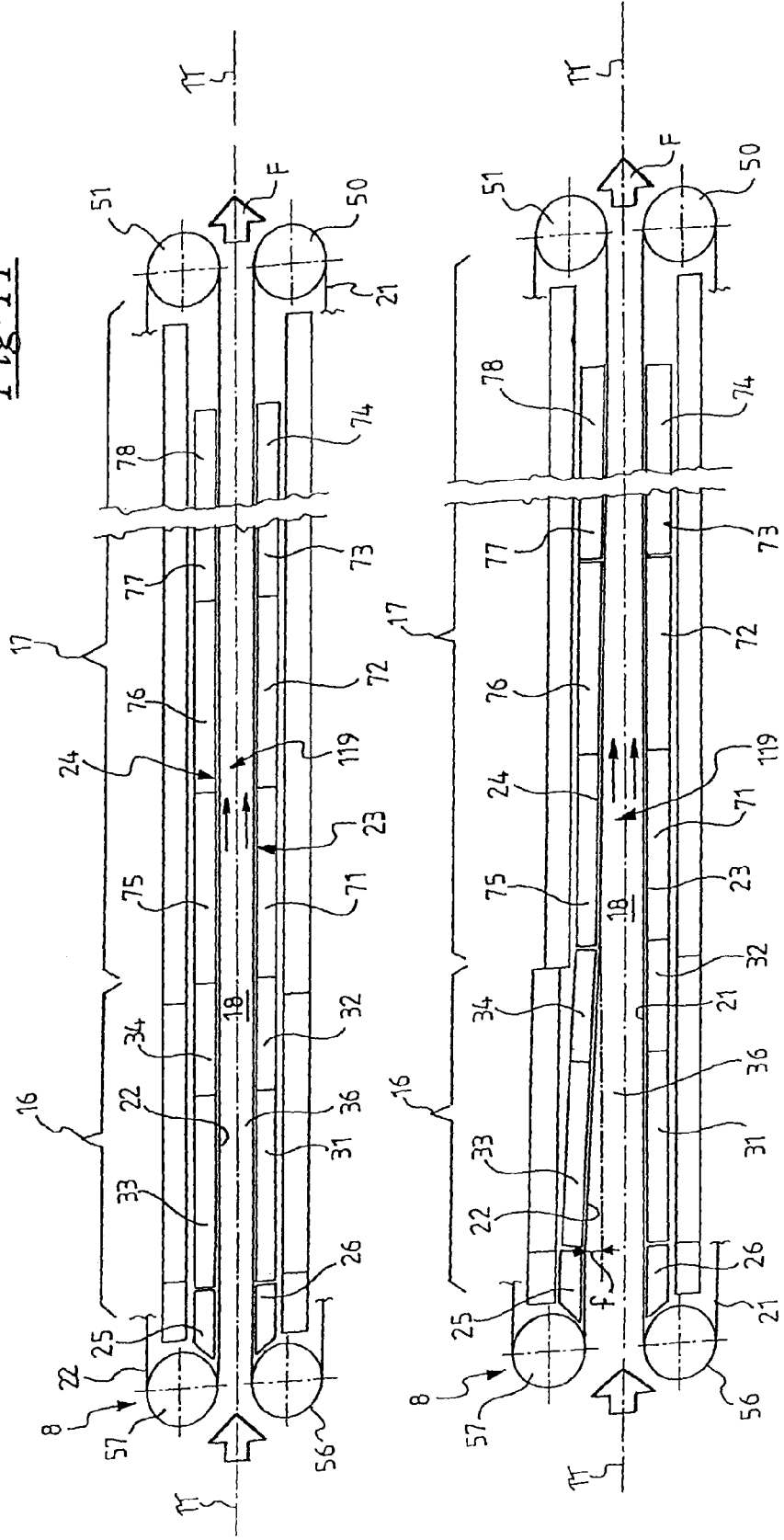

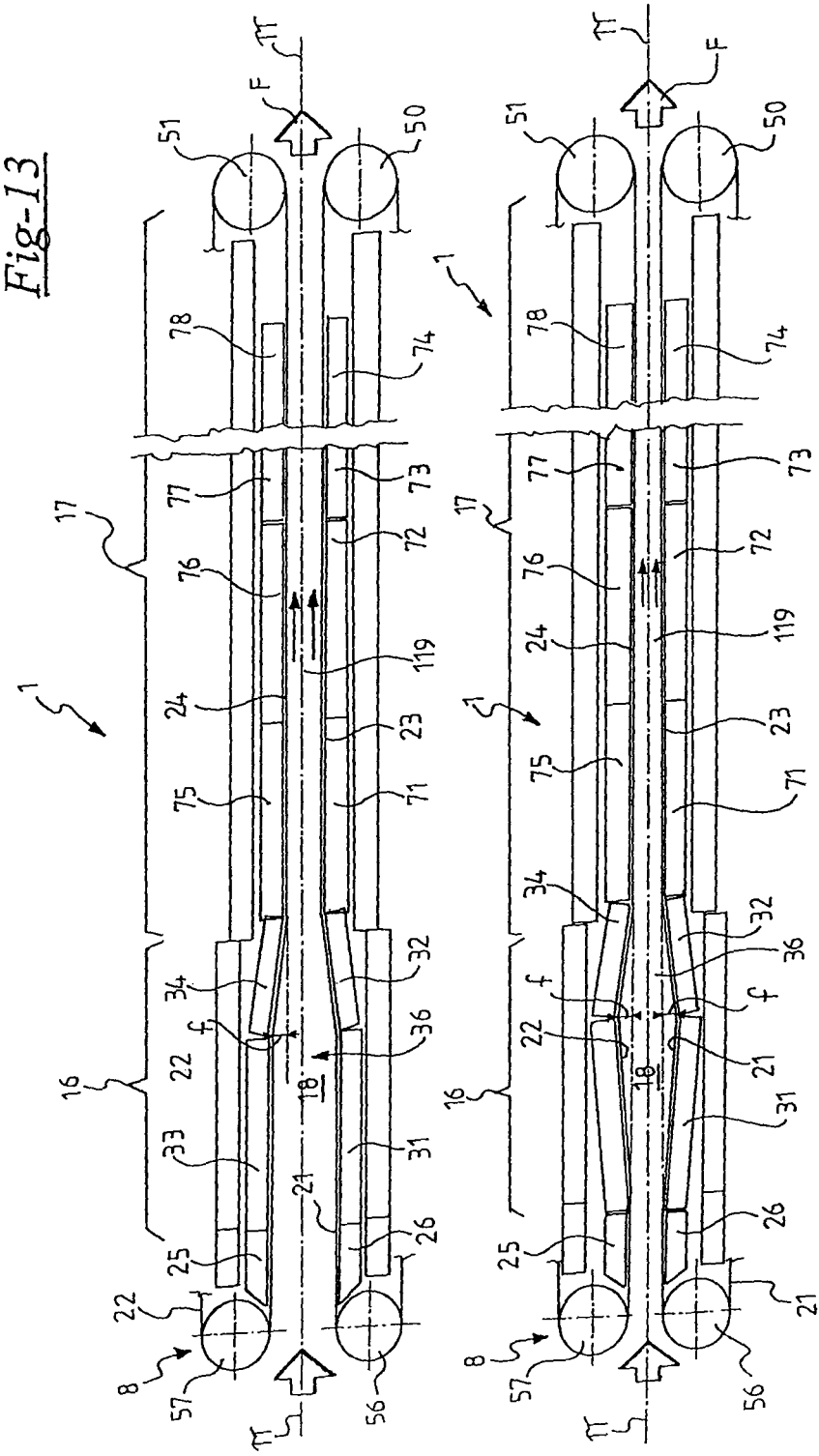

APPARATUS AND METHOD FOR CONTINUOUSLY FORMING AN ELEMENT MADE OF EXPANDED PLASTIC MATERIAL AND CONSTRUCTION ELEMENT

CROSS REFERENCE TO RELATED APPLICATIONS

This application is a U.S. National Phase Application of International Application PCT Application No. PCT/IB2008/001740 filed on Jun. 25, 2008, which claims the benefit of priority from Italian Patent Application No. MI2007A001281 filed on Jun. 26, 2007. The disclosures of International Application PCT Application No. PCT/IB2008/001740 and Italian Patent Application No. MI2007A001281 are incorporated herein by reference.

BACKGROUND OF THE INVENTION

In one general aspect thereof, the present invention relates to an apparatus and to a method for continuously forming a continuous element made of expanded plastic material.

The invention also relates to a plant for continuously manufacturing a continuous element made of expanded plastic material comprising the aforementioned apparatus, as well as to a construction element made of expanded plastic material obtainable from the aforementioned continuous element and provided with particular characteristics of surface roughness.

In a preferred embodiment, the continuous element and the construction element made of expanded plastic material which may be obtained from the same are in the form of a slab, preferably made of expanded polystyrene, which is preferably used, though not exclusively, as a heat and sound insulation element in particular for providing an insulating layer of the so-called "jacket" type of a building walls.

In the following description and in the appended claims, the term "expanded plastic material" is used to indicate a synthetic material constituted by expanded granules welded to each other and forming a closed cell structure, material obtained by an operation of expansion and mutual welding carried out by means of the action of heat and pressure on a loose mass of granules made of expandable plastic material.

In the following description and in the appended claims, the aforementioned operation of expansion and mutual welding of the granules made of expandable plastic material will also be indicated with the term of: sintering.

In the following description and in the appended claims, the term "granules made of expandable plastic material" is used to indicate a synthetic material in granular form incorporating a predetermined amount of a suitable expanding agent; such a synthetic material may be polystyrene, polyethylene, polypropylene, polyester, polyamide or copolymers thereof, while the expanding agent can be for example pentane if the granules are made of polystyrene.

In the following description and in the appended claims, the term "continuous element made of expanded plastic material" or "continuous slab made of expanded plastic material" are used to indicate an elongate element or a slab made of expanded plastic material, for example made of expanded polystyrene, which are substantially integrally made in one piece, are free of joints or discontinuities and have an indefinite length as they leave the forming apparatus.

Lastly, in the following description and in the appended claims, the teen "construction element made of expanded plastic material" is used to indicate an elongate element made of expanded plastic material, having a definite length and width, obtainable from the aforementioned continuous element.

RELATED ART

As is known, in the building industry in general, the use of construction elements made of expanded plastic material, preferably expanded polystyrene, in the form of panels or elongate elements having a suitable shape and size serving as heat and sound insulating elements, has long become a common practice.

According to the most widespread prior art, the heat and sound insulation panels of this type are obtained in a discontinuous manner by splitting into pieces of predetermined thickness a substantially parallelepipedic semi-finished product, or "block", produced by means of molding apparatuses of discontinuous type, the so-called "block-forming machines", comprising a mold wherein a molding seat is defined having a shape mating the shape of the block to be produced.

At each molding cycle, a dosed amount of pre-expanded granules made of expandable plastic material is fed into the aforementioned seat and subjected to sintering by the action of heat and pressure, so as to form a block of suitable shape and size.

At the end of the molding and of subsequent stabilizing operations, the mold is opened and the block thus produced is removed from the molding seat in order to be subsequently cut into panels having the desired thickness.

The molding seat is thus capable of accommodating other granules and starting a new production cycle.

Although substantially suitable for the purpose, the molding apparatuses of discontinuous type possess some drawbacks which are still to be overcome in a satisfactory manner.

A first drawback is related to the fact that the blocks produced by the molding apparatus of this type often have non-homogeneous density characteristics and a non-homogeneous coefficient of heat conductivity in different zones thereof.

This non-homogeneity of characteristics has in turn a negative impact on the heat and sound insulation characteristics of the panels obtained from the blocks.

This drawback is substantially due to an unsatisfactory mixing of the pre-expanded granules loaded into the molding seat which very often have a different density (due in turn to a different pre-expansion degree) so that they tend to stratify hence generating unwanted zones having different density and a different coefficient of heat conductivity in the final block.

A second drawback is related to the fact that the blocks produced in this way also often have an unwanted compact surface layer having a higher density, the so called "skin", which does not allow to achieve a proper bonding of the plaster and which must be removed before starting the laying operations on site of the panels.

It is clear that such a procedure is cumbersome and entails a considerable waste of time, to the detriment of the efficiency of the production cycle, as well as a substantial waste of material.

A third drawback is related to the fact that managing the processing operations of the blocks produced by means of molding apparatuses of discontinuous type requires a significant amount of manpower which has a negative impact on the cost of each unit of finished product.

In addition, the drawbacks outlined above are further worsened whenever the construction element made of expanded plastic material incorporates metal reinforcement elements which must be cut upstream of the molding apparatus and must be manually inserted into the molding seat, thereby increasing the complexity of the molding operations and increasing the risk that zones with non-homogeneous characteristics may be formed in the block thus produced.

SUMMARY OF THE INVENTION

The technical problem underlying the present invention is therefore that of providing an apparatus for continuously forming a continuous element made of expanded plastic material, capable of overcoming at least in part the aforementioned drawbacks.

According to a first aspect thereof, the invention relates to an apparatus for continuously forming a continuous element made of expanded plastic material as defined in attached claim 1.

More particularly, the apparatus for continuously forming a continuous element made of expanded plastic material according to the invention comprises:
a) a loading section of a loose mass of granules made of expandable plastic material;
b) a sintering section of said continuous element made of expanded plastic material, extending downstream of said loading section;
c) a stabilizing section of said continuous element made of expanded plastic material, extending downstream of said sintering section;
d) a forming tunnel extending along said sintering and stabilizing sections and defined between a pair of lateral walls and a pair of gas permeable conveyor belts, respectively lower and upper, said belts being supported by respective lower and upper supporting tracks;
wherein at least one of the supporting tracks of the gas permeable conveyor belts comprises at least one portion extending in the sintering section and angularly tiltable with respect to a transversal centerline plane of the forming tunnel for varying the height of the tunnel in the longitudinal direction.

Thanks to the aforementioned combination of features, the apparatus of the invention advantageously allows to adjust in an optimal way the expansion and the mutual welding of the granules in the sintering section.

The angularly tiltable portion of at least one of the supporting tracks of the gas permeable conveyor belts, in fact, is capable of varying the height of the tunnel in the sintering section in the longitudinal direction, that is, of varying the useful passage section of the forming tunnel in the zone where the sintering of the granules made of expandable plastic material occurs, and thus allows in this way to adjust in an optimal way both the degree of expansion of the granules as well as their mutual welding to achieve a compact structure having the desired homogenous density and the desired homogeneous and low coefficient of heat conductivity.

The continuous forming apparatus of the invention, furthermore, allows to simplify the operations related to the management and processing of the continuous element made of expanded plastic material reducing the manpower required to the advantage of the cost of each unit of the finished product.

Lastly, the continuous forming apparatus of the invention has a high operating flexibility and allows to carry out an easy adjustment of the thickness of the continuous element made of expanded plastic material, as illustrated more in detail hereinafter.

According to a preferred embodiment of the invention, the aforementioned at least one angularly tiltable portion of at least one of the supporting tracks of the gas permeable conveyor belts allows to achieve a gradual reduction of the height of the fainting tunnel by gradually increasing the pressure exerted on the continuous element made of expanded plastic material being formed as the latter moves forward in the forming tunnel. This occurs in the zone where there is the maximum expansion thrust of the granules, that is, in the sintering zone of the apparatus where the complete expansion and mutual welding of the granules made of expandable plastic material takes place.

Preferably, this gradual pressure increase is mechanically imparted by the angularly tiltable portion of at least one of supporting tracks of the conveyor belts on the continuous element made of expanded plastic material being formed thanks to the reaction thrust exerted by this portion to maintain the expanding granules within the forming tunnel, which thrust gradually increases as the height of the tunnel decreases in the longitudinal direction.

This gradual pressure increase allows not only to achieve homogeneous density characteristics and a homogeneous coefficient of heat conductivity, but also to reduce—under the same operating conditions—the amount of expanding agent (for example pentane) required to obtain the desired final shape.

In this preferred embodiment, in fact, the lower expansion thrust exerted by the granules (directed from the element made of expanded plastic material outwards) due to the use of a smaller amount of expanding agent, is compensated by a higher compression thrust (reaction thrust of the supporting tracks of the conveyor belts) directed from the outside to the inside of the element made of expanded plastic material when the latter moves along the forming tunnel.

The reduction of the expanding agent (the quantity of which can be reduced in the case of pentane from 6-8% by weight to 2-4% by weight based on the total weight of the granules), allows in turn to reduce the environmental impact of the forming operations by reducing the amount of expanding agent released into the environment and which must be collected and treated, to reduce the costs of raw material and, thus, to reduce the production costs.

According to a preferred embodiment of the invention, the aforementioned at least one angularly tiltable portion of the aforementioned at least one supporting track comprises a tiltable portion of at least one box-shaped element arranged in the sintering section.

Advantageously, the aforementioned at least one box-shaped element allows to impart a modular structure to the supporting track of the gas permeable conveyor belts in the sintering section, simplifying the manufacturing, transport and assembling operations of the forming apparatus.

In a preferred embodiment, the aforementioned at least one box-shaped element of the sintering section is angularly tiltable in its entirety and the aforementioned tiltable portion is constituted by a wall of the box-shaped element cooperating with one of the gas permeable conveyor belts.

In this way, an advantageous structural simplification of the apparatus can be achieved while maintaining the aforementioned and equally advantageous modularity characteristics of the sintering section.

Within the framework of this preferred embodiment of the invention, it is preferable and advantageous that the camber formed by the free end of the tiltable portion of the aforementioned at least one supporting track of the gas permeable conveyor belts (for example constituted by the free end of the aforementioned box-shaped element), be comprised between 0% and 50%, more preferably between 0% and 25%, of the thickness of the element made of expanded plastic material to be produced.

In general, the maximum value of the aforementioned camber defines a tilt angle of the tiltable portion of the aforementioned at least one supporting track of the gas permeable conveyor belts preferably comprised between 0° and 4°.

According to a preferred embodiment of the invention, the forming apparatus further comprises a delivering element of a hot fluid for expanding the granules made of expandable plastic material arranged at the sintering section.

In the following description and in the appended claims, the term "hot expanding fluid" is used to indicate a suitable fluid, for example vapor or a mixture of vapor and air, having a temperature, for example exceeding 90° C. in case of polystyrene, sufficient to cause the expansion of the granules made of expandable plastic material.

Preferably, the delivering element of the hot expanding fluid is conventionally supported within the aforementioned at least one box-shaped element arranged in the sintering section.

In this way, the apparatus of the invention advantageously allows to deliver the hot fluid for expanding the granules from an inside portion of the box-shaped element towards a sintering section defined in the forming tunnel at the sintering section after passing through the gas permeable conveyor belt.

In this preferred configuration, the gas permeable conveyor belt thus carries out a homogeneous distribution of the hot expanding fluid, for example vapor, along the entire sintering section thus contributing in a significant manner to achieve a uniform sintering of the granules made of expandable plastic material.

According to a preferred embodiment of the invention, the aforementioned at least one box-shaped element of the sintering section comprises at least two sections, preferably adjacent to each other, separated in a fluid tight manner and each having a respective delivering element of a hot fluid for expanding the granules made of expandable plastic material, arranged in each one of them.

In this way, the apparatus of the invention advantageously allows to deliver at different pressures the hot fluid for expanding the granules made of expandable plastic material from each of the aforementioned sections of the box-shaped element, thereby adjusting in an optimal manner the heating, expansion and the subsequent sintering of the granules made of expandable plastic material.

According to a preferred embodiment of the invention, the aforementioned at least one supporting track of the gas permeable conveyor belts comprises at least two structurally independent box-shaped elements arranged in the sintering section and aligned along the forming tunnel, each of said box-shaped elements being angularly tiltable with respect to a transversal centerline plane of the tunnel for varying the height of the latter in the longitudinal direction.

In this way, the apparatus of the invention advantageously allows to vary at will the height of the forming tunnel in the longitudinal direction, so as to define in the sintering section, for example, a first zone with a gradually increasing height to facilitate the expansion of the granules made of expandable plastic material and a second zone with a gradually decreasing height for promoting an optimal compression and mutual welding of the granules.

According to a particularly preferred embodiment of the invention, each of the upper and lower supporting tracks of the gas permeable conveyor belts comprises at least a pair of structurally independent box-shaped elements arranged in the sintering section and aligned along the forming tunnel.

This structure with structurally independent box-shaped elements of the apparatus of the invention further increases the aforementioned advantageous modularity characteristics simplifying the manufacturing, transport and assembling operations of the forming apparatus.

Within the framework of this preferred embodiment of the invention, the configuration in which at least one of the box-shaped elements of the lower supporting track and at least one of the box-shaped elements of the upper supporting track is angularly tiltable with respect to the transversal centerline plane of the forming tunnel for varying the height of the tunnel in the longitudinal direction, is preferable and advantageous.

Still more preferably, both the box-shaped elements of the lower supporting track and both the box-shaped elements of the upper supporting track are angularly tiltable with respect to the transversal centerline plane of the forming tunnel for varying the height of the tunnel in a longitudinal direction.

In this way, the apparatus of the invention advantageously allows to adjust in a very flexible manner the cross section of the forming tunnel, for example by defining the aforementioned two zones with an increasing height first and then with a decreasing height in the sintering section.

Still more preferably, the box-shaped elements of the lower and upper supporting tracks of the gas permeable conveyor belts arranged in the sintering section are symmetrically arranged with respect to the transversal centerline plane of the forming tunnel.

This symmetric configuration advantageously allows to adjust the height in a symmetric manner in the longitudinal direction or, in other words, the cross section of the forming tunnel, so as to advantageously achieve homogenous characteristics throughout the continuous element made of expanded plastic material being formed.

This symmetric configuration of the box-shaped elements is particularly advantageous when the continuous elements have a thickness greater than 10-15 cm for which it is possible to ensure the most homogenous characteristics along their thickness.

Within the framework of the preferred embodiment wherein the supporting tracks of the gas permeable conveyor belts comprise one or more box-shaped elements, it is preferable and advantageous that the box-shaped element/s be provided with one or more openings in fluid communication with a pipe or a discharge system of the hot fluid for expanding the granules made of expandable plastic material.

In this case, it is advantageously possible to vent air and possibly part of the hot expanding fluid from the box-shaped element/s so as to regulate the sintering conditions as desired.

Within the framework of the preferred embodiment wherein the supporting tracks of the gas permeable conveyor belts comprise a plurality of structurally independent box-shaped elements, the box-shaped elements arranged in the sintering section preferably comprise at least one sliding block for supporting the gas permeable conveyor belt arranged at one and preferably at both the opposite longitudinal ends of the box-shaped elements.

In this way, the apparatus of the invention advantageously allows to maintain a substantial structural continuity of the supporting tracks of the gas permeable conveyor belts between adjacent box-shaped elements ensuring a suitable sliding support of the belts and thus preventing them from bending under the action of the thrust forces generated in the sintering section upon expansion of the granules made of expandable plastic material.

Furthermore, within the framework of this preferred embodiment it is preferable that all the box-shaped elements of the supporting tracks of the gas permeable conveyor belts be provided with at least one and, preferably, two supporting sliding blocks positioned at the opposite longitudinal ends of the box-shaped element, so as to provide a suitable sliding support for the belts along substantially the entire longitudinal extension of the forming tunnel.

According to a preferred embodiment of the invention, the aforementioned at least one box-shaped element is angularly tiltable with respect to the transversal centerline plane of the forming tunnel by means of an angular adjusting device cooperating with a longitudinal end of the aforementioned at least one box-shaped element.

In this way, the apparatus of the invention advantageously allows to vary in a very easy manner the height of the forming tunnel in a longitudinal direction by intervening during the apparatus downtimes and/or maintenance periods or during the forming operations of the element made of expanded plastic material.

In a preferred embodiment, the apparatus of the invention comprises an angular adjusting device cooperating with facing longitudinal ends of adjacent box-shaped elements arranged in the sintering section.

In this way, the apparatus of the invention advantageously allows to vary in a very flexible manner the height of the forming tunnel in a longitudinal direction within the sintering section, that is, in the section requiring the aforementioned height variation, both to increase and to reduce the height according to various operating configurations of the apparatus as will be better apparent in the following, depending upon the production and/or process requirements.

In a particularly advantageous preferred embodiment, the angular adjusting device of the box-shaped element/s is adapted to intervene on the tilting angle of the box-shaped element/s during the forming operations of the element made of expanded plastic material.

To this end, the angular adjusting device is advantageously provided with a suitable sensor, such as for example a load cell, adapted to detect the thrust forces generated in the section upon expansion of the granules made of expandable plastic material and to drive in the vertical direction a displacing device of the longitudinal end of the box-shaped element/s, for example by means of a suitable control algorithm, so as to adjust the angular position of the box-shaped element/s depending on the detected thrust forces.

In this way, it is advantageously possible to automatically vary the configuration of the sintering section so as to optimize the sintering and forming conditions of the continuous element made of expanded plastic material.

According to a preferred embodiment of the invention, the loading section of the forming apparatus comprises a pair of box-shaped elements, respectively upper and lower, defining a loading zone of the granules made of expandable plastic material and a feeding device of the granules supported upstream of the loading zone.

In this way, the apparatus of the invention allows to distribute the granules made of expandable plastic material in a uniform manner throughout the entire cross section of the loading zone and of the subsequent forming tunnel.

Preferably, at least one and, still more preferably, both the aforementioned box-shaped elements of the loading section, are in fluid communication with a suction system adapted to keep the loading zone under vacuum.

In this way, the apparatus of the invention allows to minimize possible stratification phenomena of the pre-expanded granules delivered by the feeding device supported upstream of the loading zone, often having a different density, and to distribute the granules made of expandable plastic material in a still more uniform manner throughout the entire cross section of the loading section and of the subsequent forming tunnel.

In a preferred embodiment, each of the upper and lower supporting tracks of the gas permeable conveyor belts comprises at least one box-shaped element arranged in the stabilizing section.

Within the framework of this preferred embodiment, at least one of the box-shaped elements of the upper and lower supporting tracks and, still more preferably, both such box-shaped elements, are in fluid communication with a suction system adapted to keep at least one portion of the forming tunnel extending along the stabilizing section under vacuum.

In the following description and in the appended claims, the aforementioned portion of the forming tunnel extending along the stabilizing section shall also be referred to with the term "stabilizing zone".

In this way, the apparatus of the invention advantageously allows to cool in a quick manner the continuous element made of expanded plastic material formed in the sintering section, effectively stabilizing its shape and substantially preventing the formation of an outer "skin" thanks to a homogeneous cooling of the entire sintered mass of expanded plastic material. Thanks to the application of a predetermined vacuum degree in the stabilizing zone defined in the forming tunnel, in fact, it is possible to extract heat in an effective manner, and in particular the residual heating fluid, starting from the core of the sintered mass of expanded plastic material thereby preventing quicker cooling phenomena of the superficial zones which are deemed to be responsible for the formation of the aforementioned "skin".

Within the framework of this preferred embodiment, the box-shaped element/s in fluid communication with a suction system and adapted to keep under vacuum at least one portion of the stabilizing zone defined in the forming tunnel, can be arranged immediately downstream of the sintering section or at a predetermined distance from the same.

In this second case, each of the upper and lower supporting tracks of the gas permeable conveyor belts preferably comprises at least two structurally independent box-shaped elements arranged in the stabilizing section and aligned along the forming tunnel, only the second one of which being in fluid communication with the aforementioned suction system.

Thus, in this preferred embodiment, a first zone for consolidating the shape of the continuous element made of expanded plastic material, wherein the element previously formed in the sintering zone of the tunnel is subjected neither to heating nor to cooling (except for the inevitable heat dispersions towards the outside environment), and a second zone for actually cooling wherein the continuous element made of expanded plastic material is cooled by extracting the residual heating fluid according to the procedures described above, are defined in the stabilizing zone.

In a further preferred embodiment of the invention, each of the upper and lower supporting tracks of the gas permeable conveyor belts comprises at least one box-shaped element arranged in the stabilizing section and in fluid communication with a delivering system of a detaching fluid of the continuous element made of expanded plastic material from the conveyor belts.

Preferably, such detaching fluid is pressurized air delivered by a suitable delivering system, conventional per se, such as for example a compressed air tank or a compressed air distribution network or still comprising one or more fans.

In this way, the apparatus of the invention advantageously allows to promote the detachment of the continuous element made of expanded plastic material from the gas permeable conveyor belts reducing at the same time the traction force that the conveyor belts are required to exert on the element made of expanded plastic material to facilitate its movement.

In a particularly preferred embodiment of the invention, each of the upper and lower supporting tracks of the gas permeable conveyor belts comprises at least two structurally independent box-shaped elements, arranged in the stabilizing section and aligned along the forming tunnel.

Within the framework of this preferred embodiment, at least one of the box-shaped elements of the supporting tracks is in fluid communication with a suction system adapted to keep at least one portion of the forming tunnel extending along the stabilizing section under vacuum, and at least another box-shaped element of each of the supporting tracks in fluid communication with a delivering system of a detaching fluid of the continuous element made of expanded plastic material from the conveyor belts.

Preferably, the box-shaped element/s in fluid communication with the delivering system of the detaching fluid are arranged downstream of the box-shaped element/s in fluid communication with the suction system, so as to cool and stabilize the shape of the element made of expanded plastic material before promoting its detachment from the gas permeable conveyor belts.

Within the framework of this preferred embodiment, each of the upper and lower supporting tracks of the gas permeable conveyor belts may further comprise at least a third box-shaped element structurally independent from the preceding ones, without any connection with process fluids and preferably arranged upstream of the box-shaped element in fluid communication with the suction system.

Similarly to what has been illustrated hereinabove, a first zone for consolidating the shape of the continuous element made of expanded plastic material, wherein the element previously formed in the sintering zone of the tunnel is subjected neither to heating nor to cooling (except for the inevitable heat dispersions towards the outside environment), a second zone for actually cooling and third zone for detaching the continuous element made of expanded plastic material, are thus defined in the stabilizing zone.

Similarly to what has been illustrated hereinabove with reference to the sintering zone, furthermore, the optional splitting of the stabilizing section into different treating zones of the continuous element made of expanded plastic material can be achieved by a structure of the upper and lower supporting tracks of the gas permeable conveyor belts including only one box-shaped element comprising a corresponding number of subsequent sections separated from each other in a fluid tight manner.

This configuration with a single box-shaped element allows to obtain a structural simplification of the stabilizing section of the apparatus and to achieve the aforementioned advantageous technical effects but to the detriment of a lower flexibility and a greater complication of the manufacturing, transport and assembling operations of the apparatus.

Similarly to what has been illustrated hereinabove with reference to the sintering zone, the box-shaped elements of the upper and lower supporting tracks of the gas permeable conveyor belts arranged in the stabilizing section are preferably symmetrically arranged with respect to the to the transversal centerline plane of the forming tunnel so as to obtain the desired symmetry and stabilization homogeneity of the element made of expanded plastic material previously formed in the sintering section.

In a preferred embodiment, at least one and preferably both the gas permeable conveyor belts are constituted by a gas permeable flexible element, preferably a synthetic material net or a woven fabric.

In this case, the gas permeable conveyor belts advantageously possess suitable flexibility characteristics and advantageously allow at the same time to confer suitable surface finishing characteristics to the continuous element made of expanded plastic material, for example by conferring to such an element a textured surface capable of allowing, during the installation on site, an effective and direct bonding of other finishing elements, such as a plaster layer.

According to this embodiment of the invention and as will be better apparent in the following, the aforementioned textured surface of the continuous element made of expanded plastic material is formed by means of a partial penetration of a superficial portion of the element into a perforated area of the gas permeable conveyor belts.

According to this preferred embodiment, furthermore, the gas permeable conveyor belts are capable of distributing the various process fluids (hot expanding fluid, detaching fluid) in a uniform manner along the entire extension surface, upper and lower, of the continuous element made of expanded plastic material and of cooling in an equally uniform manner the continuous element made of expanded plastic material by extracting the hot expanding fluid of the granules made of expandable plastic material as well as extracting its possible condensates.

In order to optimize the surface finishing characteristics of the continuous element made of expanded plastic material and the distribution/extraction uniformity of the process fluids, the gas permeable flexible element constituted, for example by the aforementioned synthetic material net or woven fabric, preferably has a perforated area comprised between 8% and 20% of its total area preferably distributed in a homogeneous manner on the entire extension surface of the belts.

In a preferred embodiment, the gas permeable conveyor belts are configured to form a closed loop without joints so as to provide the continuous element made of expanded plastic material with uniform surface finishing characteristics, free of reliefs and hollows which might alter its continuity, In a preferred embodiment, the gas permeable conveyor belts are moved in the forming tunnel by respective pulling groups supported at a free end of the stabilizing section.

Preferably, the pulling groups comprise at least one roller motorized in a way known per se to those skilled in the art.

In a preferred embodiment, the pulling groups comprise at least one tensioning device and/or at least one centering device of the conveyor belts.

In this case, the apparatus of the invention allows to keep the gas permeable conveyor belts suitably tensioned and to ensure that there are no lateral drifts when transporting the continuous element made of expanded plastic material along the forming tunnel and which could jeopardize the subsequent cutting operations of the continuous element.

In a preferred embodiment, the apparatus of the invention further comprises a pair of transmission groups supported at a free end of the loading section of the granules made of expandable plastic material.

Preferably, these transmission groups comprise rollers supported in an idle manner by the apparatus and contribute to achieve a regular movement as well as a uniform tensioning of the gas permeable conveyor belts.

In a particularly preferred embodiment, each of the upper and lower supporting tracks of the gas permeable conveyor belts comprises at least one box-shaped element arranged in the loading section, at least one box-shaped element arranged in the sintering section and at least one box-shaped element arranged in the stabilizing section.

The apparatus of the invention therefore possesses in this preferred embodiment an overall configuration of the modular type achieving in an optimal way the advantages related to this configuration (operating flexibility, simplification of the manufacturing, transport and assembly operations).

According to a preferred embodiment of the invention, the apparatus further comprises at least one positioning device adapted to position in an adjustable manner at least one of the supporting tracks of the gas permeable conveyor belts from and to the opposite supporting track for adjusting the height of the forming tunnel.

In this case, the apparatus of the invention advantageously allows to adjust in a very easy manner the height of the forming tunnel in its entirety, even without adjusting its height in a longitudinal direction, by intervening on a part of the apparatus easily accessible from the outside during the apparatus downtimes and/or maintenance periods.

Preferably, the aforementioned positioning device comprises at least one mechanical jack provided with respective motor means.

In the preferred embodiment in which one or more sections of the apparatus comprise one or more structurally independent box-shaped elements, the apparatus may comprise a plurality of mechanical jacks, motorized in an independent manner or, alternatively, kinematically connected to each other by means of a shaft rotatably driven by suitable motor means.

In this case, a suitable ascent/descent parallelism of each of the supporting tracks (constituted in turn by one or more structurally independent box-shaped elements) which define the upper and lower walls of the forming tunnel with the interposition of the gas permeable conveyor belts, can be advantageously ensured.

According to a preferred embodiment of the invention, each of the upper and lower supporting tracks of the gas permeable conveyor belts comprises a respective displacing group of the lower conveyor belt and of the upper conveyor belt.

Advantageously, these displacing groups assist the pulling groups in achieving a movement of the gas permeable conveyor belts allowing to reduce the traction force that the pulling groups should deliver and thus the traction strain exerted on the belts to obtain a regular movement of the element made of expanded plastic material formed in the forming tunnel.

Within the framework of this preferred embodiment, the aforementioned displacing groups of the lower and upper gas permeable conveyor belts are preferably arranged at the sintering section.

In this way, it is advantageously possible to move the gas permeable conveyor belts at the zone of the forming tunnel where the element made of plastic material to be transported is subjected to the higher pressures and, thus, at the zone where the gas permeable conveyor belts should exert the higher thrust in the longitudinal direction tangentially to the element made of expanded plastic material being formed to promote its movement along the forming tunnel.

In the sintering zone of the forming tunnel, in fact, the upper and lower supporting tracks and, therefore the gas permeable conveyor belts, are in a constant pressing contact against the element made of expanded plastic material being formed against which they exert a reaction force to confine the granules being expanded within the forming tunnel.

According to a preferred embodiment of the invention, the displacing groups of the lower and upper gas permeable conveyor belts comprise a supporting and displacing belt substantially of the track type.

Preferably, the supporting and displacing belt is operated by a respective motor group with the interposition of a kinematic motion transmission.

Within the framework of this preferred embodiment, the supporting and displacing belt substantially of the track type exerts two advantageous functions.

A first function is that of providing a suitable support and abutment surface for the gas permeable conveyor belts which are pressed in the sintering zone by the upper and lower supporting tracks against the element made of plastic material being formed.

A second function is that of actively transporting the element made of plastic material against which the supporting and displacing belt is pressed by moving the gas permeable conveyor belt with which the element is in contact and with which the element is substantially translationally integral in the longitudinal direction due to the friction generated therebetween by the exerted pressures.

According to a preferred embodiment of the invention, the lateral walls defining the forming tunnel of the continuous element made of expanded plastic material are coated with a self-lubricating material.

In this way, the aforementioned lateral walls advantageously facilitate the relative sliding of the continuous element made of expanded plastic material in the longitudinal direction preserving its superficial and structural integrity.

Preferably, furthermore, the lateral walls defining the forming tunnel can be suitably shaped so as to confer, if desired, a suitable shape to the lateral edges of the element made of expanded plastic material.

According to a preferred embodiment of the invention, the apparatus further includes a sealing gasket cooperating with the lateral walls defining forming tunnel of the continuous element made of expanded plastic material for laterally closing said tunnel in a sealed manner at the sintering section.

In this way, the apparatus of the invention advantageously allows both to prevent an unwanted release of the hot fluid for expanding the granules made of expandable plastic material into the outside environment thereby exploiting its heat in an optimal manner, and to drastically reduce any possible release of the expanding agent into the environment, thereby facilitating the operations of collection and disposal of this agent.

Preferably, the sealing gasket is associated to the free end of the lateral walls of the box-shaped elements and it preferably has a thickness substantially equal to the thickness of such walls so as to minimize the space occupied within the forming apparatus.

According to a preferred embodiment, the apparatus of the invention further comprises a supporting seat for a plurality of hook elements associated to the opposite lateral ends of the lower and upper gas permeable conveyor belts for a guided sliding of said belts in the longitudinal direction.

In this way, the apparatus of the invention advantageously allows to further support the gas permeable conveyor belts at the respective opposite lateral ends and to guide their forward movement in the longitudinal direction reducing to a minimum or even preventing a transversal bending of the belts.

Within the framework of this preferred embodiment, the supporting seat of the hook elements associated to the opposite lateral ends of the gas permeable conveyor belts is preferably formed in each of lateral walls of the box-shaped elements and, still more preferably, formed in the sealing gaskets cooperating with the lateral walls defining the forming tunnel.

In this case, each of these sealing gaskets is consequently suitably shaped so as to allow the support and guided sliding of the hook elements.

This configuration of the supporting seat advantageously allows to support and laterally guide the gas permeable conveyor belts occupying at the same time the minimum space within the forming apparatus and thereby also achieving advantageous compactness characteristics.

According to a preferred embodiment of the invention, the lateral walls defining the farming tunnel of the continuous element made of expanded plastic material are supported by the lower supporting track of the lower gas permeable conveyor belt, for example by means of a plurality of suitably shaped supporting arms externally associated to the lower supporting track.

Preferably, the lateral walls defining the forming tunnel are further supported so as to be freely laid on and freely removed from the arms or, in any case, from suitable supporting elements of the lower supporting track of the lower conveyor belt thereby facilitating the assembling operations of these walls which form the lateral closing elements of the forming tunnel.

Within the framework of this preferred embodiment, the supporting arms of the lateral walls are substantially L-shaped so as to define a housing seat of the walls having a suitable thickness (preferably substantially equal to the thickness of the lateral walls) and they are provided at one of their free ends with a longitudinal supporting beam adapted to keep the lateral walls against the lower supporting track of the lower conveyor belt.

Preferably, the aforementioned longitudinal supporting beam is further provided with a sealing gasket preferably of the expandable type under the action of a suitable expanding fluid (for example compressed air), adapted to exert in expanded condition an effective pressing action against the lateral wall during the forming operation, which pressing action may be stopped during the apparatus downtimes and/or maintenance periods.

According to a preferred embodiment, the apparatus of the invention further comprises a plurality of restraining assemblies of the lateral walls associated to the upper supporting track of the upper gas permeable conveyor belt, and which contribute to keep the lateral walls in contact against the supporting tracks of the gas permeable conveyor belts.

Preferably, these restraining assemblies comprise a supporting arm externally associated to the upper supporting track entirely analogous to the lower supporting arm and arranged in a symmetrical manner to the latter with respect to the transversal centerline plane of the forming tunnel.

In this way, the combined action of the upper and lower supporting arms, both provided with longitudinal supporting beams and inflatable gaskets, advantageously allows both to press the lateral walls against the supporting tracks of the lower and upper conveyor belts laterally, thereby closing in an effective manner the forming tunnel during the forming operations, and to easily remove the lateral walls during the apparatus downtimes and/or maintenance periods.

According to a preferred embodiment of the invention, the apparatus further comprises a closing plate of the loading section of the granules made of expandable plastic material and provided with shaped openings for introducing into the forming tunnel respective reinforcing section bars of the continuous element made of expanded plastic material.

In this way, the apparatus of the invention advantageously allows to manufacture, if desired, a continuous element made of expanded plastic material provided with one or more reinforcing section bars which increase the self-supporting characteristics of the construction element which may be subsequently obtained from such a continuous element.

Preferably, the aforementioned shaped openings are provided with respective gaskets or sealing elements conventional per se, so as to prevent—as outlined above—any dispersion into the outside environment of the hot fluid for expanding the granules made of expandable plastic material and of the expanding agent of the latter.

According to a second aspect thereof, the invention relates to a method for continuously forming a continuous element made of expanded plastic material by providing a forming tunnel (18) between a pair of lateral walls (19,20) and a pair of gas permeable conveyor belts (21,22), respectively lower and upper, of a forming apparatus (1); feeding a loose mass of granules made of expandable plastic material into a loading zone (27) of said apparatus (1); forming a continuous element (2) made of expanded plastic material by subjecting said granules to expansion and mutual welding in a sintering zone (36) of said tunnel (18) extending downstream of the loading zone (27); stabilizing said continuous element (2) made of expanded plastic material in a stabilizing zone (119) extending downstream of the sintering zone (36); and wherein said step of forming a continuous element (2) made of expanded plastic material comprises subjecting the mass of granules under forming and mutual welding to a variable pressure along the longitudinal direction of the forming tunnel (18) obtained by varying the height of the tunnel (18) in the longitudinal direction.

More particularly, the method of the invention comprises the steps of:
providing a forming tunnel between a pair of lateral walls and a pair of gas permeable conveyor belts, respectively lower and upper, of a forming apparatus;
feeding a loose mass of granules made of expandable plastic material into a loading zone of said apparatus;
forming a continuous element made of expanded plastic material by subjecting said granules to expansion and mutual welding in a sintering zone of said tunnel extending downstream of the loading zone;
stabilizing said continuous element made of expanded plastic material in a stabilizing zone extending downstream of the sintering zone;
wherein said step of forming a continuous element made of expanded plastic material comprises subjecting the mass of granules under forming and mutual welding to a variable pressure along the longitudinal direction of the forming tunnel obtained by varying the height of the tunnel in the longitudinal direction.

Advantageously, the forming method of the present invention allows to adjust in an optimal way the sintering of the granules in the sintering section by varying the height of the tunnel in the longitudinal direction and, hence, by varying the pressure exerted by the gas permeable conveyor belts against the continuous element made of expanded plastic material along the longitudinal direction of the forming tunnel.

In this way, the forming method of the invention allows to adjust in an optimal way both the expansion degree of the granules and their mutual welding to give a compact structure having the desired homogeneous density and the desired homogeneous and low coefficient of heat conductivity.

The continuous forming method of the invention further allows to simplify the operations related to the management and processing of the continuous element made of expanded plastic material reducing the use of manpower to the advantage of the cost of each unit of the finished product.

Lastly, the continuous forming method of the invention has a high flexibility and allows to carry out an easy adjustment of the thickness of the continuous element made of expanded plastic material by varying the height of the forming tunnel in the longitudinal direction.

Preferably, the method of the invention is carried out by moving the gas permeable conveyor belts and thus moving forward the element made of expanded plastic material along the forming tunnel at a speed comprised between 5 and 30 m/min, still more preferably between 10 and 20 m/min, depending upon the thickness of such element, which thickness is preferably comprised in turn between 2 and 50 cm.

According to a preferred embodiment of the invention, the aforementioned forming step of the continuous element made of expanded plastic material comprises subjecting the mass of granules under expansion and mutual welding to a progressively increasing pressure for at least one portion of the sintering zone.

Within the framework of this preferred embodiment, the progressive increase of the pressure exerted on the mass of granules under expansion and mutual welding in the sintering zone is mechanically achieved by reducing the height of the forming tunnel in the longitudinal direction.

In this preferred embodiment, the forming method of the present invention therefore allows to carry out both a sintering of the granules made of expandable plastic and a lamination of the continuous element made of expanded plastic material thus formed obtained by means of the action of the gas permeable conveyor belts by gradually reducing the height of the tunnel in the longitudinal direction.

This progressive increase of the pressure exerted onto the continuous element made of expanded plastic material being formed not only allows to reduce—under identical processing conditions—the amount of the expanding fluid (for example pentane) required to obtain the final required shape, but also to achieve, thanks to the lamination effect consequent to the movement of the conveyor belts, homogeneous density characteristics and a homogeneous coefficient of heat conductivity.

In this preferred embodiment, in fact, the lower expanding thrust of the granules (directed from the element made of expanded plastic material outwards) due to use of a lower amount of expanding agent is compensated by a greater compression force (directed from the outside towards the inner part of the element made of expanded plastic material) exerted on the element made of plastic material.

As illustrated above, the reduction of the expanding agent (the quantity of which can be reduced, when using pentane, from 6-8% by weight to 2-4% by weight of the total weight of the granules), allows in turn to reduce the environmental impact of the forming operations by reducing the amount of the expanding agent released into the environment to be collected and treated, thereby reducing the costs of raw material and reducing the production costs.

According to a preferred embodiment of the invention, the forming step of the continuous element made of expanded plastic material comprises subjecting the mass of granules under expansion and mutual welding to a progressively decreasing pressure for at least one portion of said sintering zone.

Within the framework of this preferred embodiment, the step of subjecting the mass of granules under expansion and mutual welding to a progressively decreasing pressure is mechanically achieved by progressively increasing the height of the forming tunnel in the longitudinal direction.

This progressive decrease of the pressure exerted onto the continuous element made of expanded plastic material being formed allows to achieve an optimal expansion of the granules of expandable plastic material exploiting to a maximum extent—under the same operating conditions—the expanding capacity of the expanding agent (for example pentane) included in the granules.

According to a preferred embodiment of the invention, the forming step of the continuous element made of expanded plastic material comprises the steps of:
  subjecting the mass of granules under expansion and mutual welding to a progressively decreasing pressure in at least a first portion of the sintering zone, and
  subjecting the mass of granules under expansion and mutual welding to a progressively increasing pressure in at least a second portion of the sintering zone.

In this way, it is advantageously possible to have an optimal sintering of the granules made of expandable plastic material obtaining both an optimal expansion of the granules in an initial stage of the sintering, and an optimal mutual welding of the granules made of expandable plastic material in a final stage of the sintering.

According to a preferred embodiment of the invention, the forming step of the continuous element made of expanded plastic material is carried out so as to obtain a partial penetration of a superficial portion of such element being formed in the sintering zone into a perforated area of at least one of the gas permeable conveyor belts.

In this way, the method of the invention advantageously allows to confer suitable surface finishing characteristics to the continuous element made of expanded plastic material, for example by providing such element with a textured surface which allows to achieve, during the laying operations on site, an effective and direct bonding of other finishing elements, such as a plaster layer.

Within the framework of this preferred embodiment of the method of the invention, it is preferable and advantageous to use one or preferably two gas permeable conveyor belts constituted by a net made of synthetic material or by a woven fabric having the characteristics outlined above.

In this way, it is advantageously possible to confer to at least one surface of the continuous element made of expanded plastic material optimal surface finishing characteristics of the so-called textured type.

According to a preferred embodiment of the invention, the step of feeding the loose mass of granules made of expandable plastic material into the loading zone of the forming apparatus is carried out by keeping the loading zone under vacuum.

In this way, the method of the invention allows to minimize possible stratification phenomena of the pre-expanded granules fed to the loading zone, often having a different density, and to uniformly distribute the granules made of expandable plastic material throughout the entire cross section of the loading zone and of the subsequent sintering zone.

According to a preferred embodiment of the invention, the aforementioned granules are subjected to expansion and mutual welding by delivering a hot expanding fluid into at least one portion of the sintering zone of the forming tunnel.

Within the framework of this preferred embodiment, the step of delivering the hot expanding fluid of the granules can be advantageously carried out in a very flexible manner, for example by delivering the hot expanding fluid through one or both the gas permeable conveyor belts, in an initial, intermediate or final portion of the sintering zone.

Preferably, the hot expanding fluid of the granules is delivered at a pressure comprised between 1 and 3 absolute bars and, still more preferably, at a pressure comprised between 1 and 1.6 absolute bars.

Preferably, the hot expanding fluid of the granules is supplied at a temperature equal to or higher than 90° C., preferably comprised between 90° C. and 120° C. and, still more preferably, comprised between 100° C. and 110° C.

In a preferred embodiment, the hot expanding fluid is constituted by pressurized air/gas mixture, in variable proportions which can be selected by a man skilled in the art on the basis of suitable tests, so as to adjust to the desired values the pressure and temperature parameters in the forming tunnel.

In the preferred embodiment which provides for delivering the hot expanding fluid through only one of the gas permeable conveyor belts, it is preferable and advantageous that this delivery is carried out through the lower gas permeable conveyor belt, that is, beneath the element made of expanded plastic material being sintered, so as to confine possible condensates within the lower part of the forming tunnel facilitating the subsequent removal of the same.

In the preferred embodiment which provides for delivering the hot expanding fluid through both the gas permeable conveyor belts, the method of the invention allows to adjust the net flow of the hot fluid by adjusting the delivering pressure upstream of each belt preferably between the aforementioned values of 1 and 3 absolute bars.

Thus, for example, it is possible to deliver the hot expanding fluid at the same pressure both above and beneath the element made of expanded plastic material being sintered, substantially confining such fluid within the forming tunnel, or deliver the hot expanding fluid beneath the element made of expanded plastic material at a pressure higher than the pressure of the hot fluid delivered above the element thereby obtaining an upwardly directed net flow of the hot fluid, or furthermore, deliver the hot expanding fluid above the element made of expanded plastic material at a pressure higher than the pressure of the hot fluid supplied beneath the element thereby obtaining a downwardly directed net flow of the hot fluid.

In the first of the aforementioned cases (delivery of the hot expanding fluid at the same pressure both above and beneath the element made of expanded plastic material being sintered), it is advantageously possible to increase the compression action which the element made of expanded plastic material is subjected to by delivering the hot expanding fluid at a pressure exceeding 1 absolute bar, thereby facilitating the sintering operations of the granules.

Advantageously, furthermore, this additional compression action can be exerted substantially uniformly along the entire longitudinal extension of the sintering zone so as to contribute to obtain an element made of expanded plastic material having the most uniform and isotropic characteristics as possible.

In this preferred embodiment, therefore, the element made of expanded plastic material can be subjected to two compression actions in the sintering zone: one mechanically exerted by reducing the height of the forming tunnel in the longitudinal direction and one exerted by suitably adjusting the pressure and the delivering direction of the hot expanding fluid.

In the second of the aforementioned cases (delivery of the hot expanding fluid at a higher pressure either above or beneath the element made of expanded plastic material being sintered), it is advantageously possible to have a pressure difference between the belts, preferably variable between 0.2 and 0.6 bars, thereby achieving both a compression action on the element made of expanded plastic material, and a downwardly directed or an upwardly directed net flow of the hot fluid as a function of the process requirements.

Advantageously, the method of the invention allows to vary in a very flexible manner the sintering conditions as a function of the characteristics of the raw material (granules of expandable plastic material) and as a function of the desired homogeneity characteristics to be conferred to the element made of expanded plastic material to be produced.

According to a preferred embodiment of the invention, the step of stabilizing the continuous element made of expanded plastic material comprises the step of cooling the continuous element in at least one portion of the stabilizing zone.

In this way, the method of the invention advantageously allows to consolidate the shape of the continuous element made of expanded plastic material before it leaves the forming apparatus.

In a particularly preferred embodiment, the step of cooling the continuous element made of expanded plastic material is carried out by keeping the aforementioned at least one portion of the stabilizing zone under vacuum.

In this way, the method of the invention advantageously allows to cool in a very quick manner the continuous element made of expanded plastic material formed in the sintering zone, thereby effectively consolidating its shape and preventing the formation of a superficial "skin" thanks to a homogeneous cooling of the entire sintered mass of expanded plastic material. Thanks to the application of a predetermined vacuum degree in the stabilizing zone defined in the forming tunnel, in fact, it is possible to effectively extract heat, and particularly the residual hot expanding fluid, starting from the core of the sintered mass of expanded plastic material, thereby preventing that quicker cooling phenomena of the superficial zones deemed responsible for the formation of the aforementioned "skin", could take place.

Within the framework of this preferred embodiment, the step of keeping under vacuum at least a portion of the stabilizing zone can be carried out in a portion of the stabilizing zone immediately downstream of the sintering section or in a portion arranged at a predetermined distance from the latter.

In this second case, therefore, a first step of shape consolidation of the continuous element made of expanded plastic material in which the latter is subjected neither to heating nor to cooling (except for the inevitable heat dispersions towards the outside environment), and a second actual cooling step in which the continuous element made of expanded plastic material is cooled by extracting the residual hot expanding fluid according to the methods described above, are carried out in the stabilizing zone of the continuous element made of expanded plastic material.

In a further preferred embodiment of the invention, the step of stabilizing the continuous element made of expanded plastic material is carried out by delivering a detaching fluid of the continuous element made of expanded plastic material from the gas permeable conveyor belts in at least one portion of the stabilizing zone.

As outlined above, this detaching fluid is preferably pressurized air delivered by a suitable delivering system, conventional per se, connected to a compressed air tank or to a compressed air distribution network.

In this way, the method of the invention advantageously allows to promote the detachment of the continuous element made of expanded plastic material from the gas permeable conveyor belts reducing at the same time the traction force that the conveyor belts should exert on the element made of expanded plastic material to promote its movement.

In a particularly preferred embodiment of the invention, the step of stabilizing the continuous element made of expanded plastic material comprises the sub-steps of a) cooling the continuous element made of expanded plastic material in at least one portion of the stabilizing zone keeping said at least one portion under vacuum, and b) delivering a detaching fluid of the continuous element made of expanded plastic material from the gas permeable conveyor belts in at least a second portion of the stabilizing zone.

Preferably, the aforementioned sub-steps a) and b) are carried out in sequence so as to cool and stabilize the shape of the element made of expanded plastic material before promoting its detachment from the gas permeable conveyor belts.

Within the framework of this preferred embodiment, the step of stabilizing the continuous element made of expanded plastic material may further comprise a sub-step c) of consolidating the shape of the continuous element made of expanded plastic material, the consolidating step c) being preferably carried out before the aforementioned step a) of cooling the continuous element made of expanded plastic material.

In this preferred embodiment, the step of stabilizing the continuous element made of expanded plastic material thus comprises the sub-steps of consolidating the shape of the continuous element made of expanded plastic material in a first portion of the stabilizing zone, cooling the continuous element made of expanded plastic material in a second portion of the stabilizing zone and detaching the element previously cooled from the gas permeable conveyor belts in a third portion of the stabilizing zone.

In a preferred embodiment, the forming method of the invention is carried out in such a manner that the core temperature within the mass of expanded plastic material of the continuous element is lower than about 80° C. at the exit of the stabilizing zone, that is, at the exit of the faulting apparatus.

In this way, it is advantageously possible to reduce the size variation phenomena which might occur upon exit from the forming apparatus and/or during the immediately subsequent periods thereby achieving an optimal gauging of the continuous element made of expanded plastic material.

According to a preferred embodiment, the method of the invention further comprises the step of moving the continuous element made of expanded plastic material by means of displacing groups arranged at the sintering zone and/or at the stabilizing zone, said displacing groups operating on the lower and upper gas permeable conveyor belts.

In this case, the method of the invention advantageously allows to reduce the traction force which should be exerted on the gas permeable conveyor belts to achieve a regular displacement of the element made of expanded plastic material formed in the forming tunnel.

Within the framework of this preferred embodiment, the aforementioned displacing groups of the upper and lower gas permeable conveyor belts are preferably arranged at the sintering zone.

In this way, it is advantageously possible to move the gas permeable conveyor belts at the zone of the forming tunnel where the element made of plastic material to be transported is subjected to the higher pressures and, thus, at the zone where the gas permeable conveyor belts should exert the greater traction effort.

Preferably, the displacing groups of the gas permeable conveyor belts comprise a supporting and displacing belt substantially of the track type, which supporting and displacing belt is advantageously capable of supporting in a suitable manner the gas permeable conveyor belts with which the supporting and displacing belt is substantially translationally integral and capable of distributing the traction force throughout the entire transversal extension of the conveyor belts.

According to a preferred embodiment, the method of the invention further comprises the step of keeping the gas permeable conveyor belts under tension.

In this way, it is advantageously possible to transport in a regular manner the element made of expanded plastic material without having unwanted bending phenomena of the gas permeable conveyor belts.

According to a further preferred embodiment, the step of forming a continuous element made of expanded plastic material is carried out by keeping the sintering zone substantially closed in a vapor-tight manner.

In this way, it is advantageously possible to prevent an unwanted release of the hot expanding fluid of the granules made of expandable plastic material into the external environment, thereby exploiting its heat in an optimal manner and drastically reducing a possible release of the expanding agent into the environment, facilitating the collection and disposal operations of the same.

According to a third aspect thereof, the invention relates to a method for continuously forming a construction element made of expanded plastic material by continuously forming a continuous element (2) made of expanded plastic material according to the method of the second aspect of the invention; and cutting to size the continuous element (2) made of expanded plastic material.

More particularly, this method of invention comprises the steps of:

continuously forming a continuous element made of expanded plastic material according to the method described above;

cutting to size said continuous element made of expanded plastic material.

According to a fourth aspect thereof, the invention relates to a construction element made of expanded plastic material comprising at least one textured surface by subjecting a loose mass of granules made of expandable plastic material to expansion and mutual welding in a sintering zone (36) of a forming tunnel (18) defined between a pair of gas permeable conveyor belts (21,22) so as to obtain a continuous element (2) made of expanded plastic material; and cutting to size said continuous element (2) made of expanded plastic material; wherein said at least one textured surface is formed by means of partial penetration of a superficial portion of the continuous element (2) into a perforated area of at least one of said belts.

More particularly, the construction element made of expanded plastic material of the invention comprises at least one textured surface and is obtainable by the steps of a) subjecting a loose mass of granules made of expandable plastic material to expansion and mutual welding in a sintering zone of a forming tunnel defined between a pair of gas permeable conveyor belts so as to obtain a continuous element made of expanded plastic material; and b) cutting to size said continuous element made of expanded plastic material;

wherein said at least one textured surface is formed by means of partial penetration of a superficial portion of the continuous element into a perforated area of at least one of said belts.

Advantageously, the construction element made of expanded plastic material of the invention is thus provided with at least one surface having superficial finishing characteristics which facilitate the bonding of suitable materials for coating such an element, such as for example plaster, gypsum or other similar materials used in the building industry.

The textured surface of the continuous element made of expanded plastic material of the invention, furthermore, also has aesthetic characteristics which enhance its commercial value on the market.

In a preferred embodiment, textured surface finishing characteristics of special value can be obtained when at least one of the gas permeable conveyor belts is constituted by a net made of synthetic material or by a woven fabric, having the characteristics described hereinabove.

In a preferred embodiment, the textured surface of the construction element made of expanded plastic material comprises a plurality of microreliefs having a height comprised between 0.5 and 3 mm as a function of the type of material used for the conveyor belts, of the pressures exerted during the sintering step of the granules made of expandable plastic material and of the characteristics of the expandable plastic material employed.

Preferably, the microreliefs of the textured surface of the construction element made of expanded plastic material are uniformly distributed throughout substantially the entire extension of such surface.

In this way, it is advantageously possible to achieve in an optimal way the aforementioned technical and aesthetic characteristics mentioned above.

In a further preferred embodiment, the construction element made of expanded plastic material according to the invention may further comprise at least one reinforcing section bar adapted to enhance the self-supporting characteristics of the construction element and associated to or incorporated within the expanded plastic material.

Preferably, the aforementioned reinforcing section bar is made of a suitable metal or non-metal material, as known in the art, and is longitudinally extending along the construction element. Preferably, furthermore, the reinforcing section bar may have a C, Z, Ω or a double T shape or any other suitable shape adapted to achieve the desired reinforcing characteristics of the expanded plastic material reducing at the same time the manufacturing costs.

According to a fifth aspect thereof, the invention relates to a plant for continuously manufacturing a continuous element made of expanded plastic material comprising a section (4) for feeding a loose mass of granules made of expandable plastic material and an apparatus (1) for continuously forming said continuous element (2).

More particularly, the plant of the invention comprises a section for feeding a loose mass of granules made of expandable plastic material and an apparatus for continuously forming said element as illustrated in the present description.

Advantageously, the plant of the invention allows to achieve all the previously described advantageous technical effects while occupying little space and requiring minimum interventions in terms of manpower for its operation.

According to a sixth aspect thereof, the invention relates to a plant for continuously manufacturing a construction element made of expanded plastic material comprising a section (4) for feeding a loose mass of granules made of expandable plastic material; an apparatus (1) for continuously forming a continuous element (2) made of expanded plastic material arranged downstream of said feeding section (4); and a section (9) for cutting said continuous element (2) made of expanded plastic material arranged downstream of said apparatus (1).

More particularly, such a plant comprises:
a) a section for feeding a loose mass of granules made of expandable plastic material;
b) an apparatus for continuously forming a continuous element made of expanded plastic material as illustrated in the present description arranged downstream of said feeding section; and
c) a section for cutting the continuous element made of expanded plastic material arranged downstream of said apparatus.

Advantageously, also this plant allows to achieve all the previously described advantageous technical effects while occupying little space and requiring minimum interventions in terms of manpower for its operation, Advantageously, furthermore, the aforementioned cutting section allows to cut the continuous element made of expanded plastic material to size to yield a construction element having the desired length before transferring the latter to storage.

According to a preferred embodiment of the invention, the plant for manufacturing the construction element made of expanded plastic material further comprises a section for storing a plurality of construction elements made of expanded plastic material obtained from said continuous element in the cutting section.

Advantageously, it is possible to continuously form by means of the apparatus, methods and plants of the invention a continuous element made of expanded plastic material by using the raw material currently available and, starting therefrom, it is possible to obtain a construction element having at least one textured surface comprising a plurality of microreliefs having a height comprised between 0.5 and 3 mm, a uniform density comprised between 12 and 80 kg/m$^3$, a welding percentage of the granules comprised between 90% and 100% and a coefficient of heat conductivity ($\lambda$) at 23° C. not exceeding 0.034 and preferably comprised between 0.027 and 0.030 W/(m ° C.).

BRIEF DESCRIPTION OF THE DRAWINGS

Additional features and advantages of the invention will become more clearly apparent from the following description of a preferred embodiment of an apparatus and of a plant for continuously forming a continuous element made of expanded plastic material according to the invention, given hereinbelow by way of non-limitative example with reference to the accompanying drawings.

In the drawings:

FIG. 11 shows a schematic view of some elements of the apparatus of FIG. 2 in a configuration of longitudinal alignment of the box-shaped elements thereof;

FIGS. 12-14 show respective schematic views of some elements of the apparatus of FIG. 2 in different operating conditions thereof.

DETAILED DESCRIPTION OF THE CURRENTLY PREFERRED EMBODIMENTS

Figure 1:
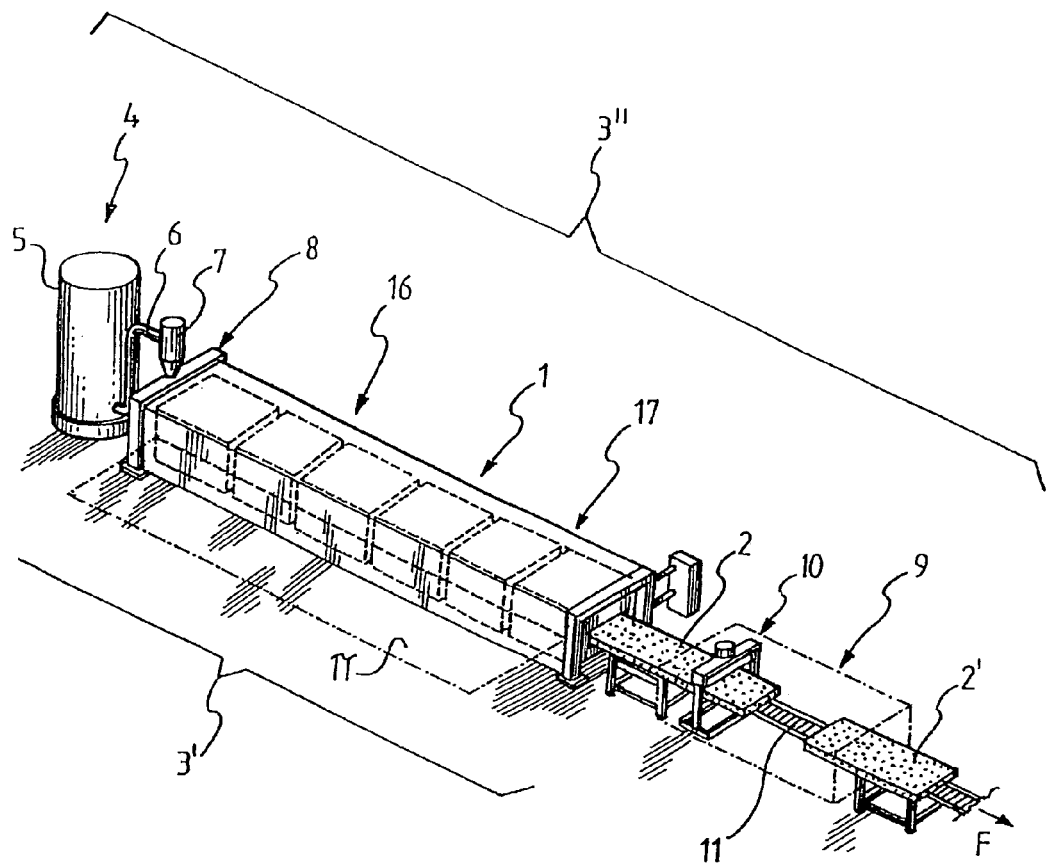
FIG. 1 shows a schematic perspective view of a portion of a plant according to the invention for continuously manufacturing a construction element made of expanded plastic material.

With reference to the aforementioned figures, an apparatus according to the invention for continuously forming a continuous element made of expanded plastic material, such as for example a continuous slab 2, for example made of expanded polystyrene, which can be used for forming a construction element 2' made of expanded plastic material and having a definite length, useable for manufacturing a heat and sound insulating layer of the so-called "jacket" type for the walls of a building, is generally indicated at 1.

In the illustrated example, the apparatus 1 is part of a plant 3' for continuously manufacturing the continuous slab 2 which also comprises a section 4 for feeding a loose mass of granules made of expandable plastic material, for example pre-expanded polystyrene.

The feeding section 4 comprises in turn a tank 5 for a temporary storage of the granules made of expandable plastic material to be fed to the apparatus 1, connected by means of a pipe 6 to a cyclone 7 connected in turn to a loading section 8 of the apparatus 1 which will be described in detail hereinafter.

In the example illustrated, the plant 3' is in turn part of a plant 3" for continuously manufacturing the construction element 2' made of expanded plastic material, further comprising a section 9 for cutting the continuous slab 2, arranged downstream of the apparatus 1 and including a cutting device 10 of the continuous slab 2, for example of the hot wire type, known per se and thus not shown in further detail.

The cutting section 9 thus allows to obtain from the continuous slab 2 a plurality of construction elements 2' made of expanded plastic material, for example panels having a predetermined length.

As described above, each of the panels 2' can be used, for example, as a heat and sound insulating element in an insulation layer of the so-called "jacket" type for the insulation of a building, or as a heat and sound insulating element for other types of use, such as for example, the insulation of truck bodies, fridges, etc.

In an equally conventional manner, the cutting section 9 includes a transporting system 11 of the continuous slab 2, for example of the conveyor belt type, and intended to move the continuous slab 2 which leaves the apparatus 1 towards the cutting device 10 and then to move the panel 2' thus obtained towards the other parts of the plant 3", for example towards a storing section, conventional per se and not shown, of a plurality of panels 2' made of expanded plastic material thus obtained.

In the preferred embodiment illustrated, the continuous slab 2 continuously formed in the apparatus 1 has a substantially parallelepipedic shape and comprises two opposite faces 12, 13, respectively upper and lower, and two opposite lateral edges 14, 15, respectively right and left with reference to the moving direction of the slab 2 in the apparatus 1 and indicated by the arrow F in the figures.

Figure 2:
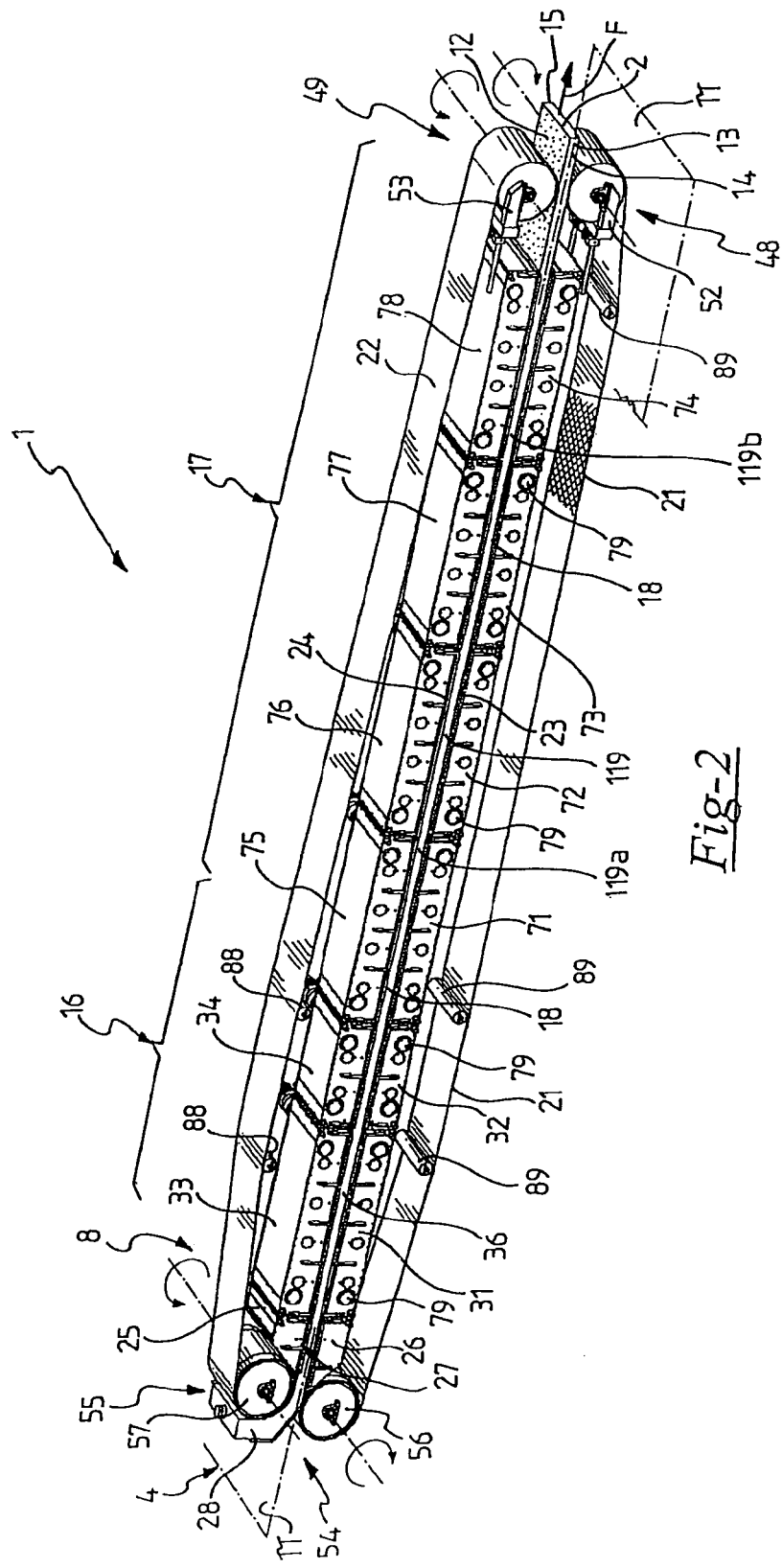
FIG. 2 shows a schematic perspective view of some details of an apparatus according to the invention for continuously forming a continuous element made of expanded plastic material being part of the plant of FIG. 1.
Figure 3:
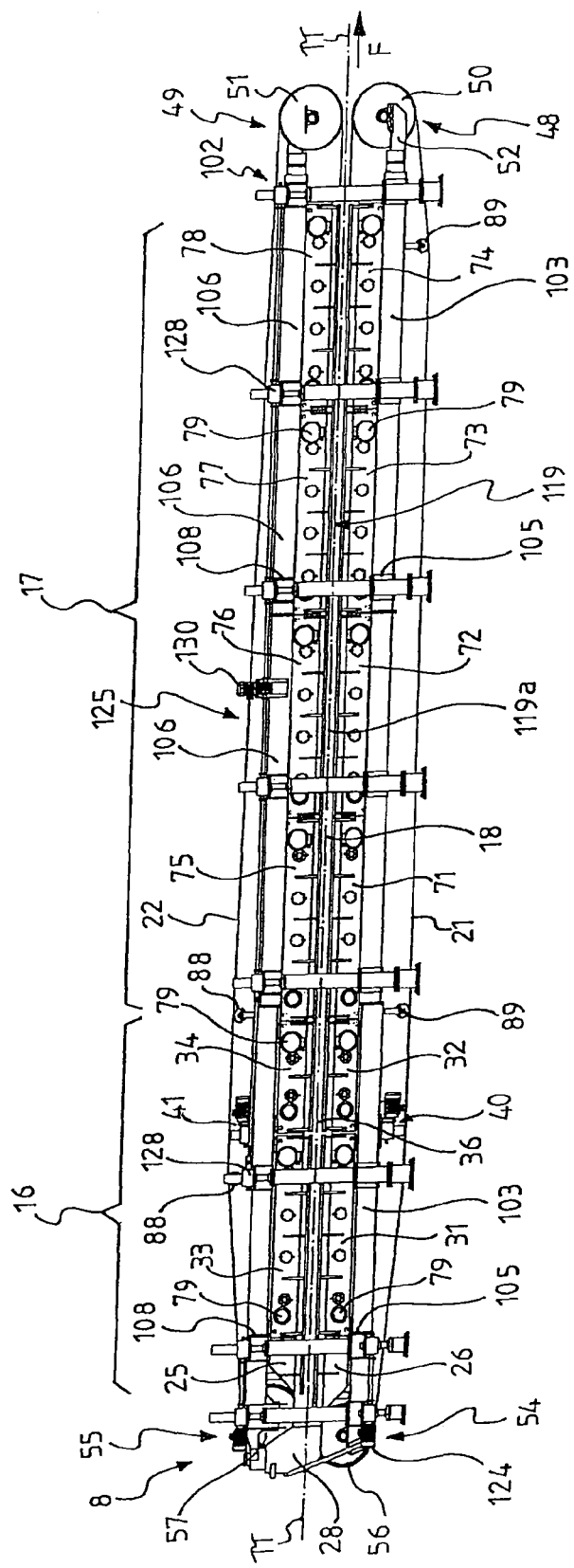
FIG. 3 shows a schematic side view of some details of the apparatus of FIG. 2.

As schematically indicated in FIGS. 2 and 3, the apparatus 1 comprises the aforementioned loading section 8 of the loose mass of granules made of expandable plastic material, a sintering section 16 of the continuous slab 2 extending downstream of the loading section 8 and a stabilizing section 17 of the continuous slab 2 extending downstream of the sintering section.

The apparatus 1 further comprises a forming tunnel 18 extending along the sintering and stabilizing sections 16, 17 and, in this preferred case, also along the loading section 8 of the loose mass of granules made of expandable plastic material.

In particular, the forming tunnel 18 is defined between a pair of lateral walls 19, 20, respectively right and left with reference to the moving direction F of the slab 2 (see FIGS. 4 and 5), and a pair of gas permeable conveyor belts 21, 22 respectively lower and upper (see FIGS. 2 and 3).

In the preferred embodiment illustrated, the gas permeable conveyor belts 21 and 22 are constituted by a flexible fabric made of synthetic material, and more preferably made of a polyester fabric modified in weft and yarn and highly resistant to hydrolysis.

This fabric made of synthetic material preferably has a perforated area comprised between 8% and 20% of the total area of the fabric, distributed in a homogeneous manner throughout the entire surface extension thereof and is configured to form a jointless closed loop.

In this way, the gas permeable conveyor belts 21 and 22 are advantageously capable to confer uniform surface finishing characteristics to the opposite faces 12, 13 of the continuous slab 2, for example to confer to such faces a textured surface which allows during the laying operations on site an effective and direct bonding of other finishing elements, such as for example plaster.

Preferably, the textured surface of the opposite faces 12, 13 of the continuous slab 2 comprises a plurality of microreliefs having a height comprised between 0.5 and 3 mm which are uniformly distributed substantially throughout the entire extension of such textured surface formed by the gas permeable conveyor belts 21 and 22.

Advantageously, the gas permeable conveyor belts 21 and 22 of this type also have suitable flexibility characteristics and allow at the same time to uniformly distribute or extract the various process fluids (hot expanding fluid, detaching fluid) and the possible condensates which form in the forming tunnel 18, throughout the entire surface extension, upper and lower, of the continuous slab 2, as will be better apparent in the following description.

The gas permeable conveyor belts 21, 22 are supported in a conventional manner along the forming tunnel 18 by respective supporting tracks 23, 24, respectively lower and upper, at least one of which comprises at least a portion extending in the sintering section 16 and angularly tiltable with respect to a transversal centerline plane it of the forming tunnel 18 for varying the height of the tunnel itself in the longitudinal direction as will be better apparent in the following.

In the preferred embodiment illustrated, the loading section 8 the apparatus 1 comprises a pair of box-shaped elements 25, 26, respectively upper and lower, defining in the forming tunnel 18 a loading zone 27 of the granules made of expandable plastic material, and a feeding device 28 of the granules supported upstream of the loading zone 27.

The feeding device 28 can for example be constituted by a shaped hopper connected to the cyclone 7 of the section feeding 4 of the granules of the plant 3' and adapted to close, preferably in a substantially sealed manner, an end of the loading zone 27.

In the preferred embodiment illustrated, at least one and preferably both the box-shaped elements 25, 26 of the loading zone 8 are in fluid communication, in a way known per se and not shown in the drawings, with a suction system, for example a vacuum device, adapted to keep the loading zone 27 defined in the faulting tunnel 18 under vacuum.

In this way, the apparatus 1 advantageously allows to minimize possible stratification phenomena of the pre-expanded granules, often having a different density, fed by the feeding device 28 supported upstream of the loading zone 27 and to uniformly distribute the granules made of expandable plastic material throughout the entire cross section of the loading zone 27 and of the subsequent forming tunnel 18.

In the preferred embodiment illustrated, the aforementioned at least one angularly tiltable portion of at least one of the supporting tracks 23, 24 is constituted by a wall of at least one box-shaped element arranged in the sintering section 16 and cooperating with one of the gas permeable conveyor belts 21, 22 of the continuous slab 2, which box-shaped element being in turn angularly tiltable in its entirety.

In the preferred embodiment illustrated, at least one of the supporting tracks 23, 24 and still more preferably both the supporting tracks 23, 24, comprise at least two structurally independent box-shaped elements indicated at 31-32 and 33-34, arranged in the sintering section 16 and aligned along the forming tunnel 18.

In this preferred configuration, at least one and preferably both the box-shaped elements 31, 32 of the lower supporting track 23 and at least one and preferably both the box-shaped elements 33, 34 of the upper supporting track 24 are angularly tiltable with respect to the transversal centerline plane it of the forming tunnel 18 for varying the height of the tunnel itself in the longitudinal direction.

In this way and as schematically shown in FIGS. 11-14, it is advantageously possible to obtain a very flexible configuration of the sintering section 16 which allows to vary the height of the forming tunnel 18 in the longitudinal direction precisely in the zone where the sintering of the granules made of expandable plastic material occurs so as to adjust in an optimal manner both the expansion degree of the granules and their mutual welding to give a compact structure having the desired homogeneous density and the desired homogeneous and low coefficient of heat conductivity.

Thus, for example, the apparatus 1 advantageously allows to vary at will the height of the forming tunnel 18 in the longitudinal direction so as to define in the sintering section 16 a sintering zone 36 having any one of the following operating configurations:

- a configuration of conventional type wherein the sintering zone 36 has a substantially constant height (FIG. 11);
- a first configuration according to the invention wherein the sintering zone 36 has a progressively decreasing height to promote an optimal compression and mutual welding of the granules, according to a substantially trapezoidal configuration of the box-shaped elements 31-34 (FIG. 12);
- a second configuration according to the invention wherein the sintering zone 36 comprises a first part having a substantially constant height followed by a second part having a substantially decreasing height in the longitudinal direction to promote an optimal compression and mutual welding of the granules previously expanded in the first zone, (FIG. 13); or
- a third configuration according to the invention wherein the sintering zone 36 comprises a first part having a progressively increasing height, adapted to facilitate the expansion of the granules made of expandable plastic material, and a second part having a progressively decreasing height to promote an optimal compression and mutual welding of the granules previously expanded in the first zone, according to a substantially rhomb-shaped configuration of the box-shaped elements 31-34 (FIG. 14).

Within the framework of this preferred embodiment of the invention, it is preferable and advantageous that the camber f formed by the free end of the box-shaped elements 31-34 supporting the gas permeable conveyor belts 21, 22 with respect to a plane parallel to the transversal centerline plane t of the forming tunnel 18, be comprised between 0% and 25% of the thickness of the element made of expanded plastic material to be produced (see FIGS. 12-14).

Generally, the value of the aforementioned camber f defines a tilting angle of the box-shaped elements 31-34 supporting the gas permeable conveyor belts 21 and 22 comprised between 0° and 4°.

In the preferred embodiment illustrated, the box-shaped elements 31, 32 and 33, 34 of the lower 23 and upper 24 supporting tracks of the gas permeable conveyor belts 21, 22 arranged in the sintering section 16 are symmetrically arranged with respect to the transversal centerline plane π of the forming tunnel 18.

This symmetric configuration advantageously allows to adjust in a symmetric manner the height in the longitudinal direction, in other words, the passage section of the forming tunnel 18, to the advantage of the homogeneity characteristics of the continuous slab 2 being formed, especially for slabs having a thickness exceeding 10-15 cm.

In order to achieve the sintering of the granules made of expandable plastic material, the apparatus 1 further comprises at least one delivering element of a hot expanding fluid of the granules made of expandable plastic material arranged at the sintering section 16.

In the preferred embodiment illustrated in the figures, each of the box-shaped elements 31-34 preferably comprises a plurality of delivering elements, all schematically indicated at 35, conventionally supported within the box-shaped elements 31-34.

Preferably, the hot expanding fluid is constituted by pressurized vapor or by a pressurized air/water mixture (for example a mixture comprising between 5% and 30% by volume of air), while the delivering elements 35 are constituted by a perforated manifold (for example provided with holes having a diameter of 5-15 mm) connected in a way known per se, not shown, to a distribution system of the hot expanding fluid arranged outside of the apparatus 1.

As illustrated in greater detail in FIGS. 4 and 5, each of the delivering elements 35 is capable of delivering pressurized vapor into the box-shaped elements 31-34 of the sintering section, which vapor permeates through the wall cooperating with each one of the gas permeable conveyor belts 21, 22, which is conveniently of the gas permeable type as will be illustrated in more detail hereinafter, and thus through the respective gas permeable conveyor belts 21, 22 to enter into the sintering zone 36 and promote the sintering of the granules made of expandable plastic material.

In an alternative preferred embodiment, not shown in the drawings, one or more of the box-shaped elements 31-34 of the sintering section 16 may comprise at least two sections, preferably adjacent to each other, separated in a fluid-tight manner, for example by means of an internal partition wall welded to the walls of the box-shaped element.

In this case, the apparatus 1 preferably comprises a delivering element 35 of the hot expanding fluid of the granules made of expandable plastic material arranged within each of the aforementioned sections separated in a fluid-tight manner of the box-shaped element/s 31-34.

In the preferred embodiment illustrated in the figures, one or more of the box-shaped elements 31-34 of the sintering section 16 may comprise one or more openings (shown closed by covers in the figures), all indicated at 79, intended to allow a fluid communication between the internal portion of each box-shaped element 31-34 and an external system for collecting a possible fluid flow, for example constituted by a mixture of hot expanding fluid/expanding agent, leaving one or more of the box-shaped elements 31-34.

This operating condition may occur, as will be better apparent in the following, if the hot expanding fluid is delivered into the box-shaped elements 31-34 of one of the two supporting tracks 23 and 24 at a different pressure with respect to the delivering pressure into the box-shaped elements of the opposite supporting track, thereby generating a leaving net flow of fluid from one or more of the box-shaped elements 31-34.

In the preferred embodiment with multiple box-shaped elements shown in the drawings, the apparatus 1 further comprises a plurality of supporting sliding blocks of the gas permeable conveyor belt arranged at one or preferably both the opposite longitudinal ends of the box-shaped elements of the lower 23 and upper 24 supporting tracks arranged in the sintering section 16.

Figure 7:
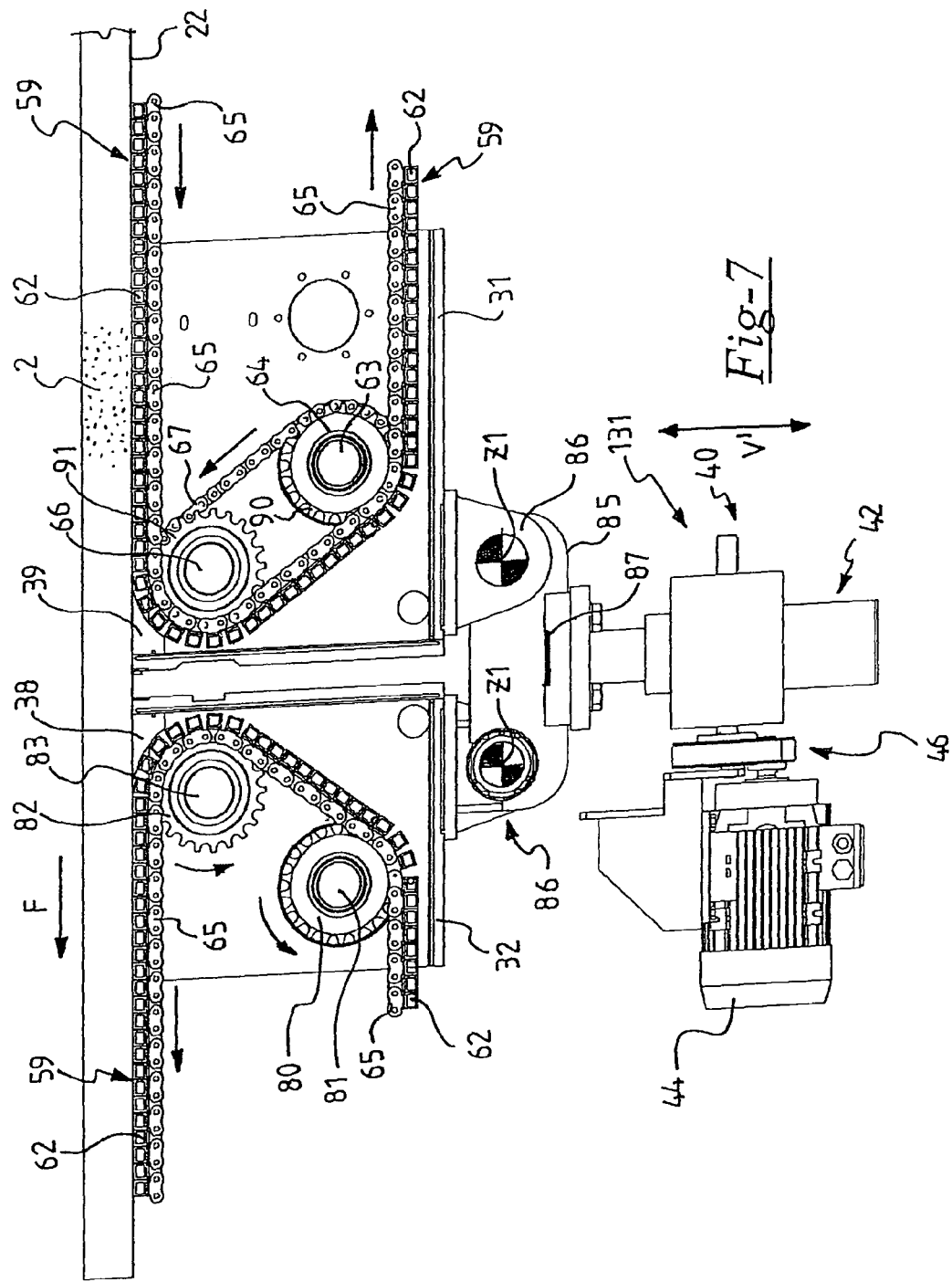
FIG. 7 shows a longitudinal partial section view in a further enlarged scale of some details of the sintering section and of an angular adjusting device interposed between a pair of box-shaped elements of such section.

In the preferred embodiment illustrated in FIG. 7, which shows for the sake of simplicity only the supporting sliding blocks 38, 39 arranged at the opposite longitudinal ends of the box-shaped elements 31, 32 of the lower supporting track 23 (the corresponding supporting sliding blocks 38, 39 between the box-shaped elements 33 and 34 of the upper supporting track 24 being entirely identical), the supporting sliding blocks 38, 39 are constituted by a pair of substantially trapezoid-shaped blocks respectively fixed to the box-shaped elements 31 and 32.

In this way, the apparatus of the invention advantageously allows to maintain a substantial structural continuity of the supporting tracks 23, 24 of the gas permeable conveyor belts 21, 22 between adjacent box-shaped elements thereby ensuring an adequate sliding support of the belts and thus preventing that the latter may bend under the action of the thrust forces which develop in the sintering section 36 upon expansion of the granules made of expandable plastic material.

Clearly, the apparatus 1 comprises as many supporting sliding blocks 38, 39 as are required to ensure the structural continuity between adjacent box-shaped elements of the supporting tracks 23, 24 of the gas permeable conveyor belts 21, 22.

Thus, for example, the supporting sliding blocks 38, 39 can also be arranged between the loading section 8 and the sintering section 16, between the sintering section 16 and the stabilizing section 17, and/or within the stabilizing section 17 if in such a section the supporting tracks 23, 24 of the gas permeable conveyor belts 21, 22 are constituted by one or more box-shaped elements.

In the preferred embodiment illustrated in the figures, the box-shaped elements 31-34 arranged in the sintering section 16 are angularly tiltable with respect to the transversal centerline plane $\pi$ of the forming tunnel 18 by means of a plurality of respectively lower 40 and upper 41 angular adjusting devices, preferably cooperating with at least one longitudinal end of the box-shaped elements 31-34.

In this way, the apparatus 1 advantageously allows to vary in a very simple and flexible manner the height of the forming tunnel 18 in the longitudinal direction.

Figure 5:
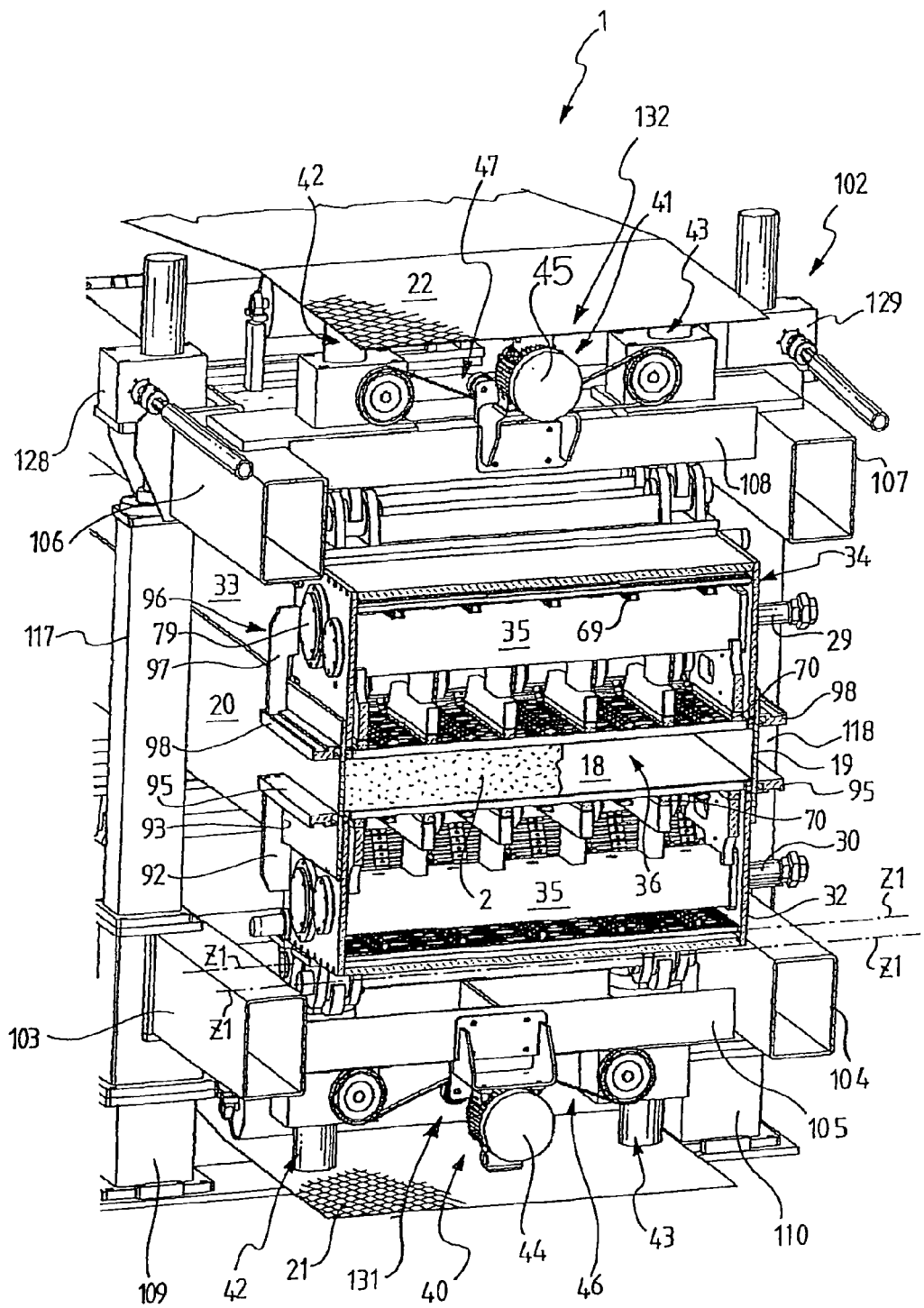
FIG. 5 shows a perspective view in partial cross-section, made through a point of the sintering section of the apparatus of FIG. 2.

FIGS. 5 and 7 show further details of the angular adjusting devices 40, 41 which, as may be seen in such figures, cooperate with facing longitudinal ends of the adjacent box-shaped elements 31 and 32 defining the lower supporting track 23 and, respectively, of the adjacent box-shaped elements 33 and 34 defining the lower supporting track 24 of the gas permeable conveyor belts 21 and 22.

According to the preferred embodiment illustrated in the figures, the apparatus 1 allows to effectively adjust the height of the forming tunnel 18 in the longitudinal direction thanks to the presence of the angular adjusting devices 40 and 41 at the facing longitudinal ends of the adjacent box-shaped elements 31, 32 and 33, 34 arranged in the sintering section 16 and thanks to the fact that these box-shaped elements are pivoted to a movable supporting structure of the apparatus 1, which will be illustrated in greater detail the following, at their opposite longitudinal ends respectively facing the loading section 8 and the stabilizing section 17 of the apparatus.

Figure 4:
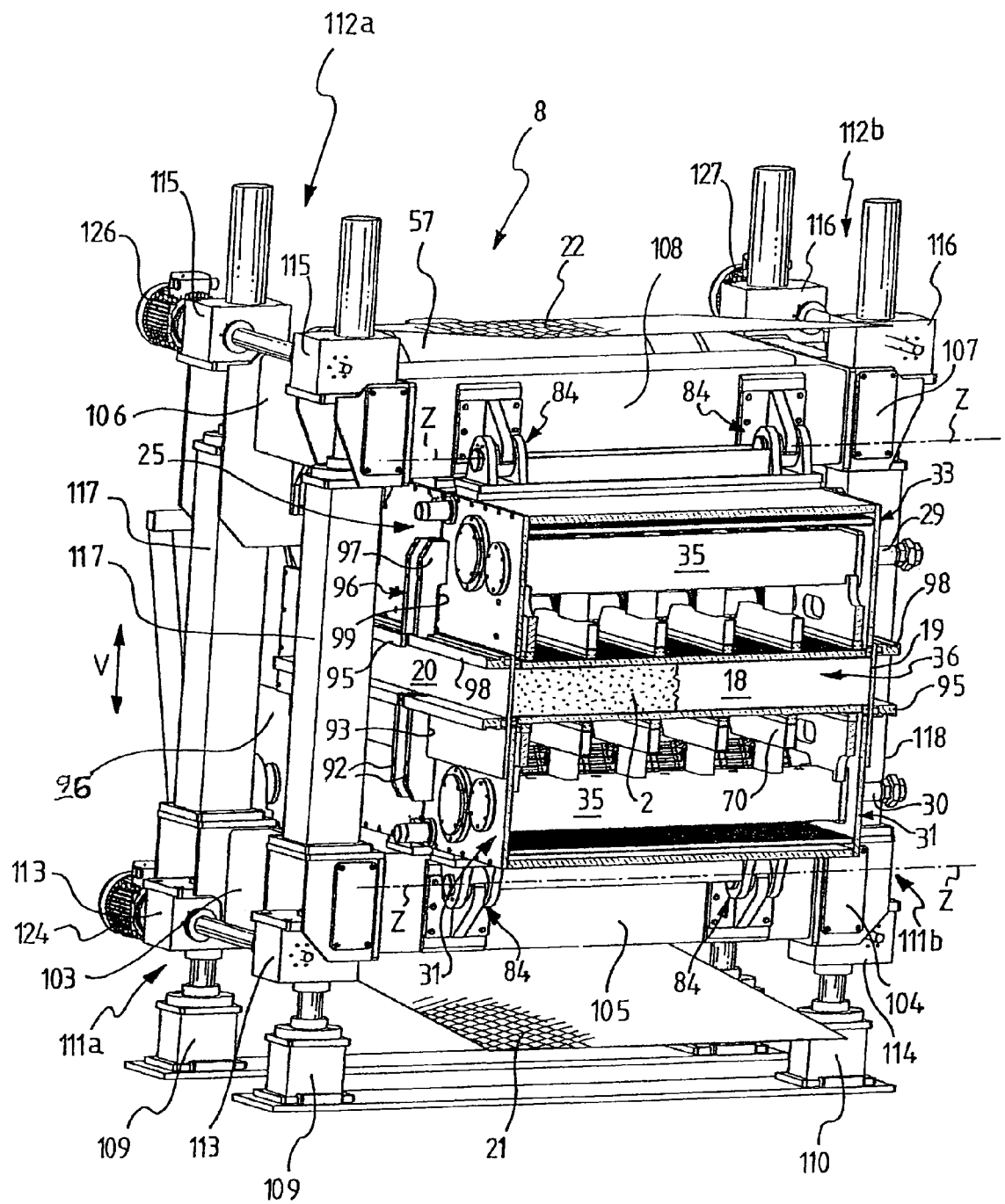
FIG. 4 shows a perspective view in partial cross-section of the loading section of the granules made of expandable plastic material into the apparatus of FIG. 2.

Such a pivoting is achieved for example by means of a plurality of hinges, conventional per se and indicated at 84 in FIG. 4, which allow the adjacent box-shaped elements 31, 32 and 33, 34 to rotate with respect to the movable supporting structure associated to the loading section 8 and to the stabilizing section 17.

In this way, each hinge 84 defines a pivoting axis z-z about which each of the box-shaped elements 31-34 rotates at its longitudinal end facing the loading section 8 or the stabilizing section 17 of the apparatus, so as to be tiltable with respect to the transversal centerline plane $\pi$ of the forming tunnel 18.

As may be seen in FIGS. 5 and 7, each of the angular adjusting devices 40, 41 comprises a plurality of displacing devices 131, 132 of the facing longitudinal ends of the box-shaped elements 31, 32 and 33, 34 of the sintering section 16.

Preferably, the displacing devices 131, 132 comprise respective jacks 42, 43, operated in a conventional manner known per se by respective motor means 44, 45 by means of a belt drive 46, 47.

In the preferred embodiment illustrated and as better shown in FIG. 7, each of the jacks 42, 43 is associated to a movable supporting beam 85 transversely extending near the facing longitudinal ends of the adjacent box-shaped elements 31, 32 and 33, 34.

In this preferred embodiment, the adjacent box-shaped elements 31, 32 and 33, 34 are pivoted to the movable supporting beam 85 for example by means of a plurality of hinges, conventional per se and indicated at 86 in FIG. 7, which allow the adjacent box-shaped elements 31, 32 and 33, 34 to rotate with respect to the movable supporting beam 85 associated to the jacks 42, 43.

In this way, each hinge 86 defines a second pivoting axis z1-z1 (see FIGS. 5 and 7) about which each of the box-shaped elements 31-34 is rotatable at a longitudinal end thereof facing the adjacent box-shaped element of the sintering section 16, so as to be tiltable with respect to the transversal centerline plane $\pi$ of the forming tunnel 18.

According to this preferred embodiment, the desired tilting angle is thus attained by the displacing devices 131, 132 by operating the jacks 42, 43 which displace upwardly or downwardly the facing longitudinal ends of the adjacent box-shaped elements 31, 32 and 33, 34, as shown by the double arrow V' in FIG. 7.

In a particularly preferred embodiment of the invention, the angular adjusting devices 40, 41 are provided with a suitable sensor 87, for example a load cell, adapted to detect the thrust forces which develop in the sintering section 16 upon expansion of the granules made of expandable plastic material and to drive the displacing devices 131, 132 on the basis of such thrust forces.

In this way, the angular adjusting devices 40, 41 are advantageously capable of varying in an automatic manner the configuration of the sintering section 16 by adjusting the angular position of the box-shaped elements 31-34 as a function of the thrust forces detected during the forming operation of the continuous element 2 made of expanded plastic material.

In this way, it is advantageously possible to optimize in real time the sintering and forming conditions of the continuous element 2 made of expanded plastic material during the operation of the apparatus 1.

In the preferred embodiment illustrated in the figures, the gas permeable conveyor belts 21 and 22 are moved in the forming tunnel 18 by respective pulling groups 48, 49 supported at a free end of the stabilizing section 17.

Preferably, each of the pulling groups 48, 49 comprises at least one motorized roller 50, 51 acting on the gas permeable conveyor belts 21 and 22 for moving the latter and thus for transporting the slab 2 made of expanded plastic material along the movement direction indicated by the arrow F.

In the preferred embodiment illustrated and as may be seen in FIGS. 2 and 3, the pulling groups 48, 49 further comprise respective tensioning devices 52, 53 in this case of the type comprising double effect pneumatic cylinders.

Advantageously, the tensioning devices 52, 53 allow to maintain in constant and controlled tension degree the gas permeable conveyor belts 21 and 22 thereby preventing unwanted drifts of the same.

In the preferred embodiment illustrated, furthermore, the pulling groups 48, 49 further comprise a belt centering device, conventional per se and not shown, adapted to prevent unwanted side drifts of the gas permeable conveyor belts 21 and 22 and to ensure a movement of the belts as most aligned as possible in the longitudinal direction.

In order to ensure a suitable movement of the gas permeable conveyor belts 21 and 22 within the framework of the aforementioned preferred embodiment in which each of the pulling groups 48, 49 comprises at least one motorized roller, the apparatus 1 further comprises a pair of transmission groups 54, 55 supported at a free end of the loading section 8 of the granules made of expandable plastic material.

Preferably, each of the transmission groups 54, 55 comprises at least one idle roll 56, 57 rotated by the pulling groups 48, 49 by means of the gas permeable conveyor belts 21 and 22.

In the preferred embodiment illustrated in the figures and in order to ensure a suitable tensioning action of the gas permeable conveyor belts 21 and 22 and to prevent unwanted drifts, the apparatus 1 further comprises a plurality of idler rollers 88, 89, respectively upper and lower, conventionally supported by the movable supporting structure of the apparatus 1 which will be described hereinafter.

In the preferred embodiment illustrated in the figures and in order to ensure a suitable movement of the gas permeable conveyor belts 21 and 22, each of the lower 23 and upper 24 supporting tracks of the aforementioned belts comprises a respective displacing group 58 of the lower conveyor belt 21 and of the upper conveyor belt 22.

Preferably, the apparatus 1 comprises four displacing groups 58 of the conveyor belts 21 and 22 arranged at the sintering section 16 and, more precisely, arranged in each of the box-shaped elements 31-34 of such a section.

Figure 8:
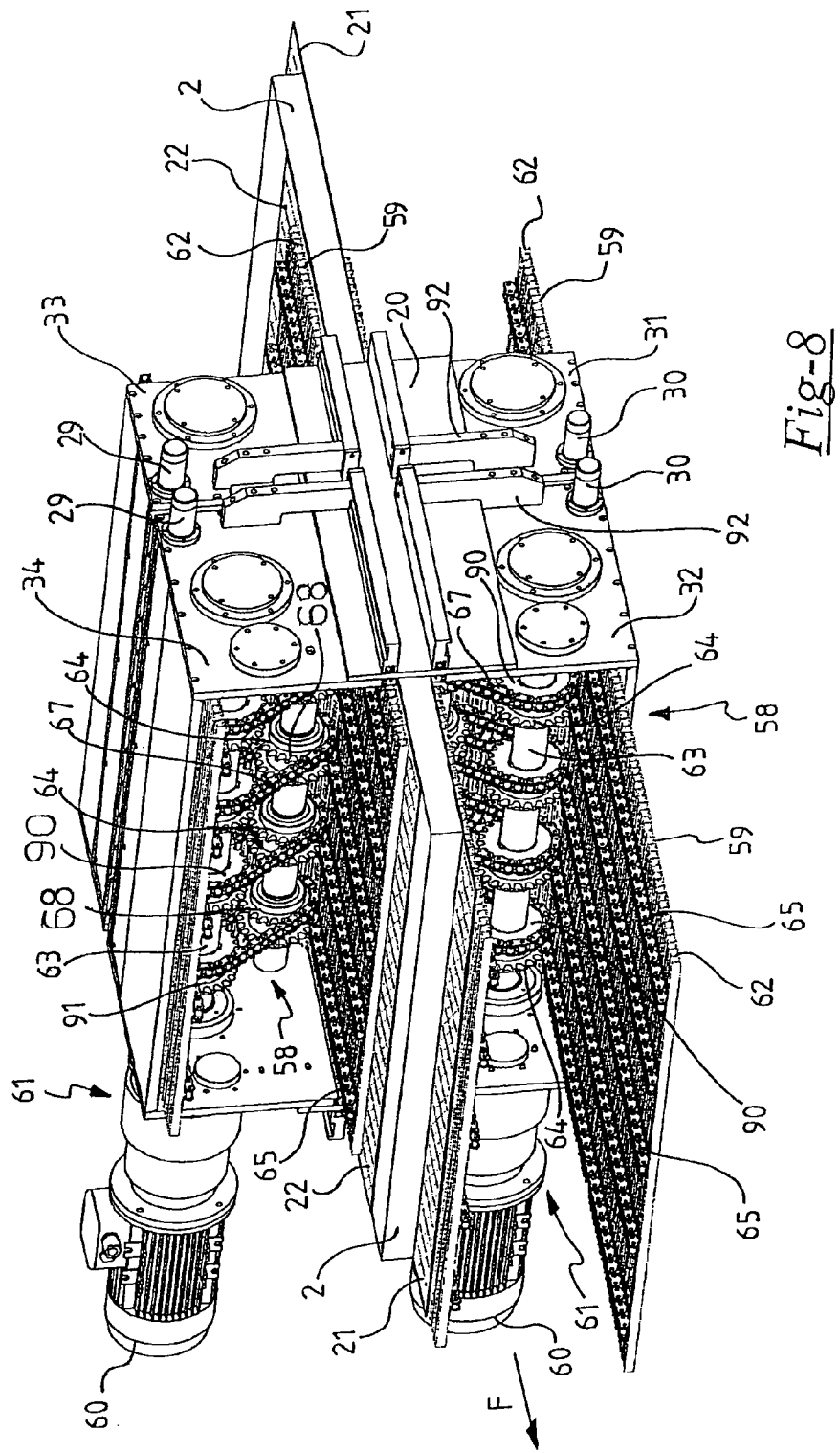
FIG. 8 shows a schematic perspective view in partial cross-section and in enlarged scale of some details of the contact zone between adjacent box-shaped elements of the sintering zone of the apparatus of FIG. 2.

The functional and structural features of the displacing groups 58, substantially identical to each other, will now be illustrated with reference to the displacing group 58 arranged in the box-shaped element 31 which is part of the lower supporting track 23 of the gas permeable conveyor belt 21 and shown in greater detail in FIGS. 6-8.

In the preferred embodiment illustrated, the displacing group 58 arranged in the box-shaped element 32 of the lower supporting track 23 will be arranged in an identical manner, while the displacing groups 58 arranged in the box-shaped elements 33 and 34 of the upper supporting track 24 will be arranged in a symmetrical manner with respect to the transversal centerline plane π of the forming tunnel 18.

Each displacing group 58 comprises in particular a supporting and displacing belt 59 substantially of the track type comprising a plurality of rectangular segments 62 hooked to each other in a conventional manner and defining therebetween a plurality of spaces or gaps adapted to allow a passage of fluid.

Thanks to this configuration, the supporting and displacing belt 59 of the gas permeable conveyor belt 21 therefore advantageously forms a movable and gas permeable wall cooperating with the aforementioned belt 21.

The belt 59 is operated by a respective motor group 60 with the interposition of a kinematic motion transmission generally indicated at 61.

More particularly, the motor group 60 rotates a driving shaft 63 on which a plurality of sprockets 64 engaging a lower branch of respective chains 65 associated to the segments 62 of the supporting and displacing belt 59, is mounted.

The motor group 60 also rotates a driven shaft 66 by means of a kinematic motion comprising a first sprocket 90 fixed to the driving shaft 63 near the motor group 60, a second chain 67 and a sprocket 68 fixed to the driven shaft 66 and engaged by the chain 67.

The driven shaft 66 moves in turn the supporting and displacing belt 59 thanks to a plurality of sprockets 91 engaging an upper branch of the chains 65 associated to the segments 62 of the belt 59.

Figure 6:
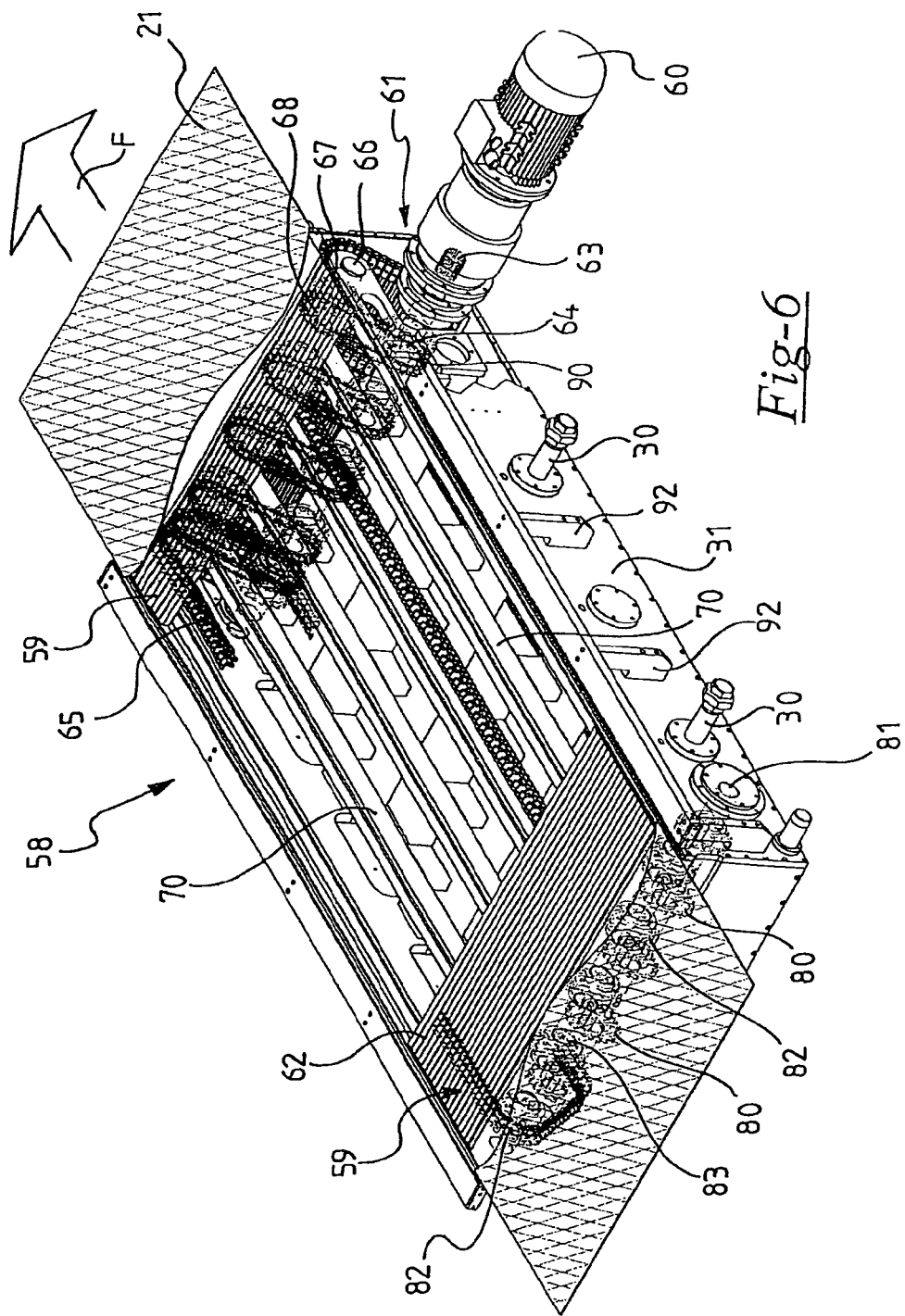
FIG. 6 shows a schematic perspective view in enlarged scale of a box-shaped element of the sintering section of the apparatus of FIG. 2.

The kinematic motion transmission 61 of the displacing group 58 further comprises a plurality of sprockets 80 fixed to a lower driven shaft 81, rotatably supported in an idle manner at a lower end of the box-shaped element 31 opposite to the motorized shaft 63, and a plurality of sprockets 82 fixed to a second upper driven shaft 83, rotatably supported in an idle manner at an upper end of the box-shaped element 31 opposite to the driven shaft 66 (see FIGS. 6 and 7).

In this way, each of the chains 65 is translationally driven along a closed loop circuit comprising an upper branch extending between the driven shaft 83 and the driven shaft 66 and a lower or return branch, extending between the driving shaft 63 and the driven shaft 81.

In the substantially trapezoid-shaped configuration of the closed loop circuit formed by the chains 65 illustrated in the figures, the upper and lower branches of this loop are connected to each other by intermediate sections extending between the shafts 66 and 63 and, respectively, between the shafts 81 and 83.

Figure 9:
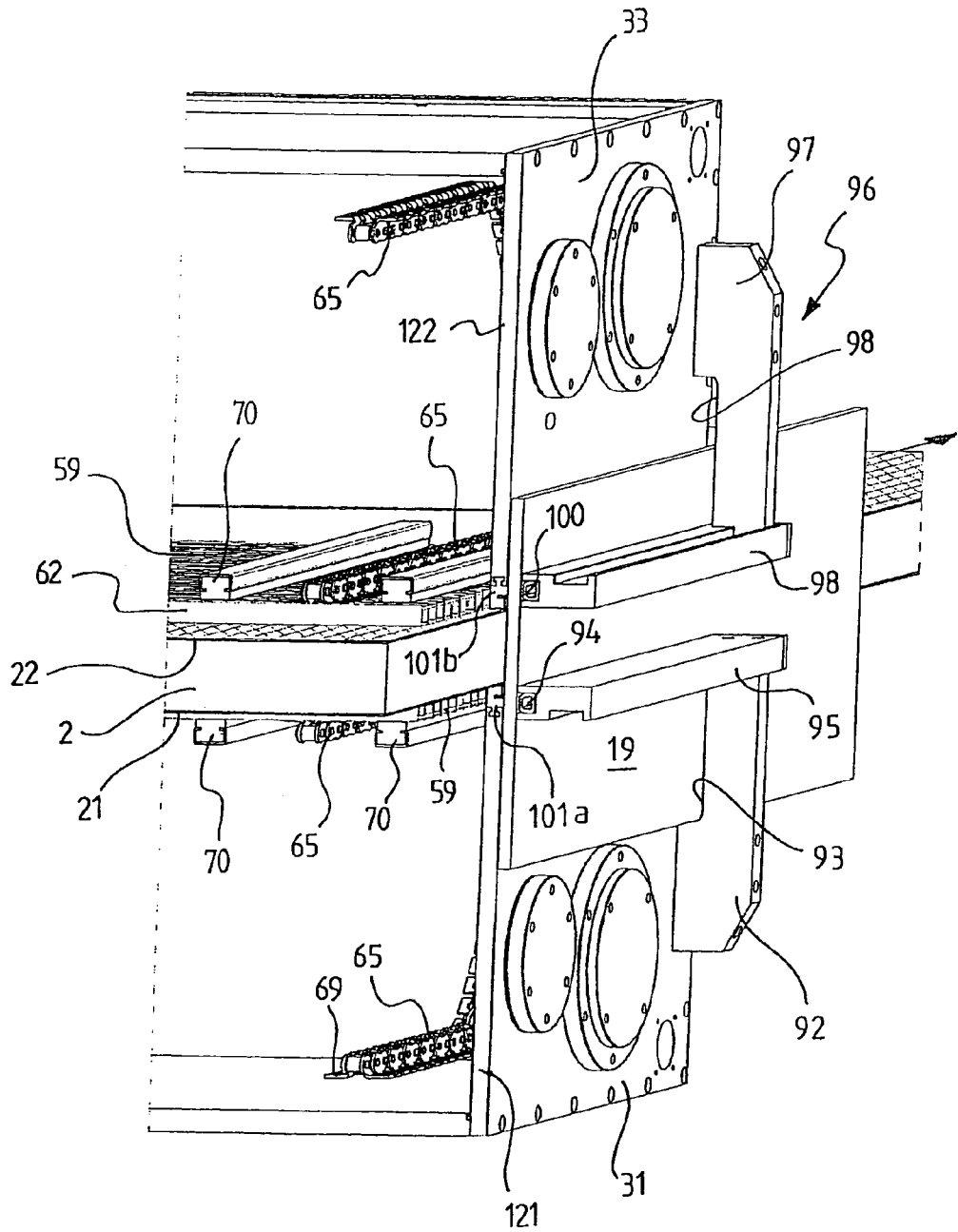
FIG. 9 shows a schematic perspective view in partial cross-section and in enlarged scale of some details of a preferred embodiment of a lateral wall and of some details of the box-shaped elements associated thereto of the apparatus of FIG. 2.

In the preferred embodiment illustrated, the chains 65 are associated to the segments 62 of the supporting and displacing belt 59 by means of a plurality of substantially U-shaped fixing elements 69 provided at their ends with flat fins fixed, for example by screwing, to the segments 62 (see FIGS. 5 and 9).

In the preferred embodiment illustrated, the supporting and displacing belt 59 of the gas permeable conveyor belts 21 and 22 is supported within each of the box-shaped elements 31-34 not only by the chains 65, but also by a plurality of longitudinal beams 70, preferably extending over the entire length of the box-shaped elements and preferably coated with a suitable self-lubricating material, for example PTFE.

Thanks to its substantially track-type structure, the supporting and displacing belt 59 of the gas permeable conveyor belts 21 and 22 achieves the following advantageous technical effects:
- an effective supporting and moving action of the gas permeable conveyor belts 21, 22 against which it is constantly pressed during the sintering operations and with which is substantially translationally integral due to the friction with substantially null relative sliding movements;
- an effective distributing action of the hot expanding fluid (for example vapor) of the granules made of expandable plastic material during the sintering step: this fluid, in fact, can pass through the belt 59 permeating through the spaces between the adjacent segments 62 and reach the inner portions the forming tunnel 18.

In the preferred embodiment illustrated in the figures, each of the lower 23 and upper 24 supporting tracks of the gas permeable conveyor belts 21 and 22 comprises at least one box-shaped element arranged in the stabilizing section 17 and, more preferably, a plurality of box-shaped elements 71-74 and 75-78 structurally independent and aligned along the forming tunnel 18 (see FIGS. 2 and 3).

In this preferred embodiment, the structurally independent box-shaped elements 71-74 and 75-78 of the lower 23 and upper 24 supporting tracks of the gas permeable conveyor belts 21 and 22 thus define a stabilizing zone 119 of the continuous slab 2 made of expanded plastic material previously farmed in the sintering zone 36.

In this preferred embodiment, the box-shaped elements 71 and 72 of the lower supporting track 23 and the box-shaped elements 75 and 76 of the upper supporting track 24 are in fluid communication with a suction system, for example comprising one or more vacuum pumps conventional per se and not shown, adapted to keep under vacuum a first portion 119a of the stabilizing zone 119 defined within the forming tunnel 18 at the stabilizing zone 17.

In this way, the apparatus 1 advantageously allows to carry out a quick cooling of the continuous slab 2 formed in the sintering section 16 effectively stabilizing its shape and substantially avoiding the formation of a superficial "skin" thanks to a homogeneous cooling of the whole sintered mass made of expanded plastic material.

In the preferred embodiment illustrated in the figures, the box-shaped elements 73 and 74 of the lower supporting track 23 and the box-shaped elements 77 and 78 of the upper supporting track 24 are in fluid communication with a delivering system, for example a compressed air distribution network or with a system comprising one or more fans conventional per se and not shown, of a suitable detaching fluid of the continuous slab 2 from the gas permeable conveyor belts 21 and 22.

In this way, the apparatus 1 advantageously allows to promote the detachment of the continuous slab 2 from the gas permeable conveyor belts 21 and 22 reducing at the same time the traction force that the pulling groups 48, 49 and the displacing group 58 of the conveyor belts 21 and 22 are required to exert on the continuous slab 2 to facilitate its displacement.

In order to allow a suitable fluid communication with the forming tunnel 18, furthermore, the box-shaped elements 71-78 of the stabilizing section 17 comprise a fluid permeable inner wall (that is the wall facing the forming tunnel 18), for example provided with a plurality of openings not illustrated in the figures.

Similarly to what has been illustrated with reference to the sintering section 16, also the box-shaped elements 71-74 and 75-78 of the lower 23 and upper 24 supporting tracks of the gas permeable conveyor belts 21 and 22 arranged in the stabilizing section 17 are symmetrically arranged with respect to the transversal centering plane π of the forming tunnel 18.

This symmetric configuration advantageously allows to suck or deliver processing fluids in a symmetrical manner from and to the forming tunnel 18 to the advantage of the homogeneity characteristics of the continuous slab 2 being formed.

In the preferred embodiment illustrated in the figures, the lateral walls 19, 20 which define the forming tunnel 18 of the continuous slab 2 made of expanded plastic material are coated with a suitable self-lubricating material, for example PTFE, so as to reduce as much as possible the friction generated between the continuous slab 2 and the lateral walls 19, 20 along the forming tunnel 18 and especially in the sintering section 16 in which the granules made of expandable plastic material are subjected to a compressing action.

In the preferred embodiment illustrated, the lateral walls 19, 20 defining the forming tunnel 18 are supported by the lower supporting track 23 of the lower gas permeable conveyor belt 21, for example by means of a plurality of suitably shaped supporting arms 92 externally associated to the box-shaped elements 26, 31, 32, 71, 72, 73 and 74 of the lower supporting track 23.

In this preferred embodiment, the lateral walls 19, 20 defining the forming tunnel 18 are further supported so as to be freely laid on and removed from the arms 92 of the lower supporting track 23 thereby facilitating the assembling operations of these walls which constitute the lateral closure elements of the forming tunnel 18.

Preferably, the supporting arms 92 of the lateral walls 19, 20 are substantially L-shaped so as to define a housing seat 93 of these walls having a suitable thickness, preferably substantially equal to the thickness of the lateral walls 19, 20, and are provided at one of their free ends with a longitudinal supporting beam 95 adapted to keep the lateral walls 19, 20 against the lower supporting track 23 of the lower conveyor belt 21.

Preferably, the longitudinal supporting track 95 is further provided with a sealing gasket 94 adapted to exert an effective pressing action against the lateral wall 19, 20 housed in the seat 93 during the forming operation (see FIG. 9).

Preferably, the sealing gasket 94 is hollow and is of the type which may be inflated by means of a suitable expanding fluid, for example compressed air, so as to exert an effective pressing action against the lateral wall 19, 20 during the forming operations and allow in this way an easy removal of the lateral wall from the seat 93 during the apparatus downtimes or maintenance periods.

In the preferred embodiment illustrated in the figures, the apparatus 1 further comprises a plurality of restraining assemblies 96 of the lateral walls 19, 20 associated to the upper supporting track 24 of the upper gas permeable conveyor belt 22 and which contribute to keep the lateral walls 19, 20 in contact with the supporting tracks 23, 24 of the gas permeable conveyor belts 21, 22 in a configuration laterally closing the forming tunnel 18.

Preferably, the restraining assemblies 96 comprise a supporting arm 97 externally associated to the upper supporting track 24 and entirely analogous to the supporting arm 92, arranged in a symmetrical manner to the supporting arm 92 with respect to the transversal centerline plane π of the forming tunnel 18.

In particular, the supporting arms 97 are substantially L-shaped so as to define a seat 99 for housing the lateral walls having a suitable thickness, preferably substantially equal to the thickness of the lateral walls 19, 20, and are provided at one of their free ends with a respective longitudinal supporting beam 98 adapted to keep the lateral walls 19, 20 against the upper supporting track 24 of the upper conveyor belt 22.

Preferably, the longitudinal supporting beam 98 is further provided with a sealing gasket 100, also preferably of the inflatable type adapted to exert an effective pressing action against the lateral wall 19, 20 housed in the seat 93 during the forming operations (see FIG. 9).

In this way, the combined action of the supporting arms 92 and 97, both provided with longitudinal supporting beams 95, 98 and with inflatable gaskets 94, 100, allows to press the lateral walls 19, 20 against the lower 23 and upper 24 supporting tracks of the conveyor belts 21, 22 so as to laterally close in an effective manner the forming tunnel 18 during the forming operation, but allowing at the same time an easy removal of the lateral walls 19, 20 during the apparatus downtimes or maintenance periods.

In the preferred embodiment illustrated above, the apparatus 1 preferably comprises respective sealing gaskets 101a, 101b cooperating with the lateral walls 19, 20 which define the forming tunnel 18 of the continuous slab 2 made of expanded plastic material for laterally closing in a sealed manner said tunnel at the sintering section 16 and preferably also at the other loading 8 and stabilizing 17 sections of the apparatus 1.

In this way, it is advantageously possible to ensure a suitable fluid tight closure of the forming tunnel 18 preventing an unwanted release of the hot expanding fluid of the granules made of expandable plastic material into the environment, to drastically reduce a possible release of the expanding agent into the environment, facilitating the collection and disposal operations of the same, as well as to simplify the optional height adjustment operations while having a simple and easily manageable structure of the box-shaped elements.

Figure 10:
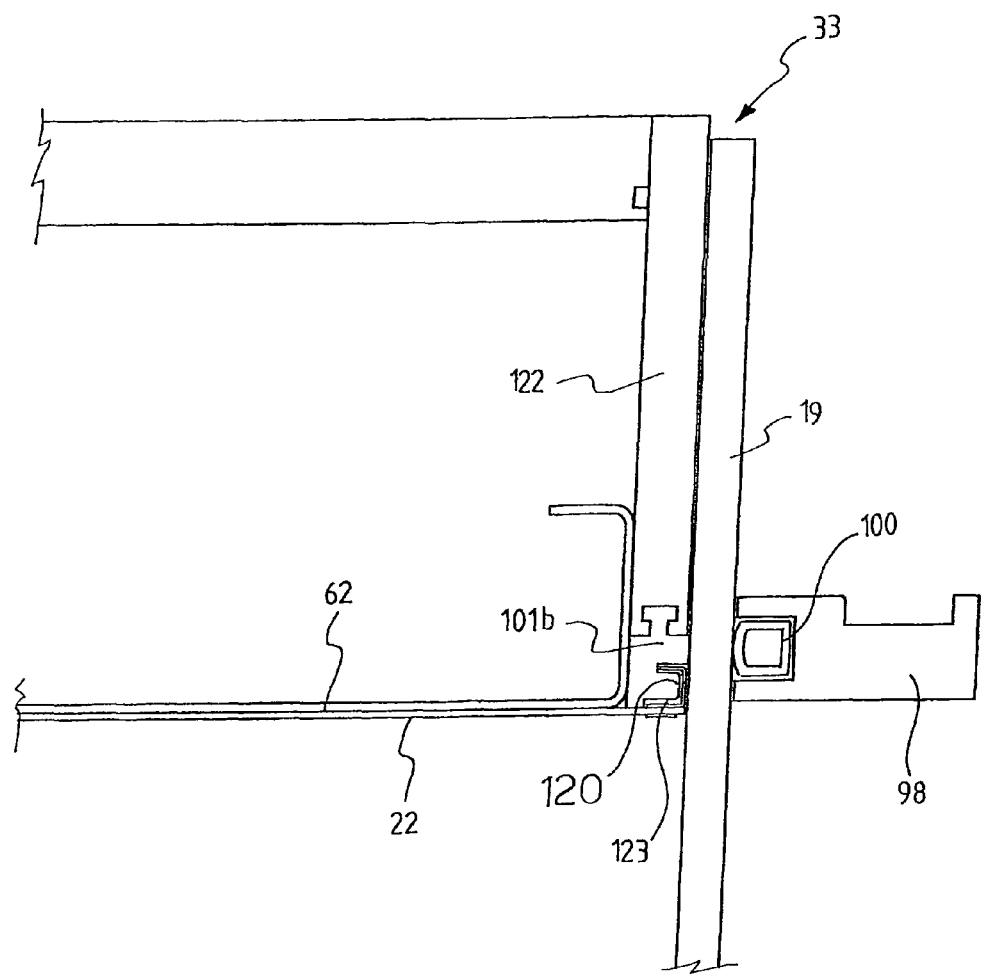
FIG. 10 shows schematic perspective view in partial cross-section and in enlarged scale of some details of the lateral wall of FIG. 8 and of some details of a box-shaped element of the apparatus of FIG. 2 near one of its lateral walls.

In the preferred embodiment illustrated, the sealing gaskets 101a, 101b are associated to the free ends of the lateral walls of the box-shaped elements, for example the free ends of the lateral walls 121 and 122 of the box-shaped elements 31, 33 as illustrated for exemplification purposes in FIGS. 9 and 10, and preferably have a thickness substantially equal to the thickness of these walls so as to minimize the space occupied within the forming apparatus.

According to the preferred embodiment illustrated, the apparatus 1 further comprises a supporting seat 120 of a plurality of hook elements 123 associated to the opposite lateral edges of the gas permeable conveyor belts 21, 22 for a guided sliding of said belts in a longitudinal direction (see FIG. 10).

Advantageously, the apparatus 1 allows in this way to further support the gas permeable conveyor belts 21, 22 at the respective opposite lateral edges and guide their forward movement in the longitudinal direction reducing to a minimum or preventing any transversal drifting of the belts.

Preferably, the supporting seat 120 of the hook elements 123 is preferably formed in the sealing gasket 101a, 101b housed in the lateral wall 121, 122 of the box-shaped elements and cooperating with the lateral wall 19, 20.

In this case, the sealing gasket 101a, 101b is accordingly suitably shaped, for example in such a way that the seat 120 be substantially C-shaped and in such a way that the seat has a shape substantially mating the shape of the hook elements 123 so as to allow a support and a guided sliding of the latter (see FIG. 10).

This configuration of the supporting seat 120 therefore advantageously allows to laterally support and guide the gas permeable conveyor belts 21, 22, occupying at the same time the minimum space within the apparatus 1 and thus also achieving advantageous compactness characteristics.

In the preferred embodiment illustrated, the loading section 8, sintering section 16 and stabilizing section 17 of the apparatus 1 in which the forming tunnel 18 is defined are conventionally supported by a supporting structure, generally indicated at 102, including a first pair of lower longitudinal beams 103, 104, parallel with each other and mutually spaced and stiffened by a plurality of lower transversal beams 105 parallel with each other and arranged at a predetermined distance along the apparatus 1, and a second pair of upper longitudinal beams 106, 107, parallel with each other and mutually spaced and stiffened by a plurality of upper transverse beams 108 parallel with each other and arranged at a predetermined distance along the apparatus 1 (see FIGS. 3, 4 and 5).

The aforementioned longitudinal beams 103, 104 and 106, 107 can be integrally formed in one piece or can be formed by a plurality of pieces having a predetermined length, for example equal to the length of the box-shaped elements which form the apparatus 1, which pieces are associated to each other to provide the required length.

According to the preferred embodiment illustrated, the apparatus 1 further comprises a plurality of positioning devices 111a, 111b, 112a, 112b, respectively lower and upper, adapted to position in an adjustable manner the supporting beams of the lower and upper box-shaped elements 26, 25 of the loading section 8, and a positioning device 125 adapted to position in an adjustable manner the supporting beams of the upper box-shaped elements 33, 34 and 75-78 of the upper supporting track 24 within the sintering section 16 and the stabilizing section 17.

Advantageously, these positioning devices allow an easy adjustment of both the height of the forming tunnel 18 in the various sections of the apparatus, and contribute to vary such a height in the sintering section 16 in cooperation with the angular adjusting device 40 arranged therein.

Preferably, the lower positioning devices 111a, 111b of the lower box-shaped element 26 of the loading section 8 comprise a plurality of lower mechanical jacks 113, 114 arranged at a predetermined distance along the apparatus 1 and provided with respective motor means 124 conventional per se, the motor means of the lower positioning device 111a being shown in FIGS. 3 and 4.

The lower mechanical jacks 113, 114 are associated to the lower longitudinal beams 103 and 104 and act on said beams to promote a displacement of the same in the vertical direction as illustrated by the double arrow V in FIG. 4. In this way, the lower mechanical jacks 113, 114 are thus capable of raising or lowering in an adjustable manner the lower supporting track 23 of the lower gas permeable conveyor belt 21 at the loading section 8.

Preferably, the upper positioning devices 112a, 112b of the upper box-shaped element 25 of the loading section 8 comprise a plurality of upper mechanical jacks 115, 116, arranged at a predetermined distance along the apparatus 1 in a manner corresponding to the lower jacks 113, 114, and provided with respective motor means 126, 127 conventional per se (see FIG. 4).

The upper mechanical jacks 115, 116 are associated to the upper longitudinal beams 106 and 107 and they act on said beams to promote a displacement of the same in the vertical direction as illustrated by the double arrow V in FIG. 4. In this way, the upper mechanical jacks 115, 116 are thus capable of raising or lowering in an adjustable manner the upper supporting track 24 of the upper gas permeable conveyor belt 22 at the loading section 8.

In the illustrated embodiment, the positioning device 125 adapted to position in an adjustable manner the supporting beams of the box-shaped elements 33, 34 and 75-78 of the upper supporting track 24 comprises a plurality of mechanical jacks 128, 129 preferably associated to the upper longitudinal beams 106 and 107 and/or to the transversal beams 108, preferably operated by respective motor means, also conventional per se, the motor means 130 for operating the jacks 128 associated to the longitudinal beam 106 being shown in FIG. 3.

In this preferred embodiment, the upper mechanical jacks 128, 129 are kinematically connected to each other by means of respective shafts rotatably driven by the motor means 130, so as to raise or lower in an adjustable manner the box-shaped elements 33-34 and 75-78 of the upper supporting track 24 of the upper gas permeable conveyor belt 22, so as to determine the most suitable height of the forming tunnel 18 as a function of the production requirements.

Preferably, the upper mechanical jacks 115, 128 and 116, 129 are mounted on respective substantially tubular uprights 117, 118 which define a substantially cage-shaped supporting structure 102 with the lower longitudinal beams 103, 104, the upper longitudinal beams 106, 107 and the transversal beams 105 and 108.

The uprights 117, 118, furthermore, are associated in a removable manner to the upper jacks 115, 116 and 128, 129 so as to allow a periodical replacement of the upper gas permeable conveyor belt 22 during maintenance periods.

In the preferred embodiment illustrated, the lower longitudinal beams 103 and 104 (or the beam pieces which can constitute the same) lie in turn on a plurality of supporting foots 109, 110 optionally associated in a removable manner to the beams to facilitate the replacement operations of the conveyor belts.

In a possible further preferred embodiment, not shown in the drawings, the forming apparatus 1 can further comprise a closing plate of the loading section 8 of the granules made of expandable plastic material, provided with shaped openings for introducing corresponding reinforcing section bars of the continuous slab 2 into the forming tunnel 18 so as to enhance the self-supporting characteristics of the slab thus produced.

With reference to the forming apparatus 1 and to the plant 3' described above, a preferred embodiment of a method according to the invention for continuously forming a continuous element made of expanded plastic material, for example the continuous slab 2 described hereinabove, will now be illustrated.

More particularly, the method will be illustrated with reference to steady-state operating conditions of the apparatus 1 in the configuration of the box-shaped elements 31-34 of the sintering section 16 illustrated in FIG. 14.

These steady-state operating conditions are conveniently achieved by carrying out the preliminary steps of providing the forming tunnel 18 between the lateral walls 19, 20 and the gas permeable conveyor belts 21 and 22, of tilting the box-shaped elements 31-34 of the sintering section 16 as illustrated in FIG. 14 by operating the angular adjusting devices 41 cooperating with the opposite ends of the box-shaped elements 31, 32 and 33, 34, and of starting the forming operations.

In a first operating step of the method, a loose mass of granules made of expandable plastic material, for example pre-expanded polystyrene granules including pentane as expanding agent, is fed from the feeding section 4 into the loading section 27 of the apparatus 1.

Preferably, this feeding step of the granules made of expandable plastic material is carried out by keeping the loading zone 27 under vacuum by connecting the box-shaped elements 25 and 26 to a suitable system capable of maintaining a predetermined vacuum degree in such a zone.

Preferably, the vacuum degree applied to the loading zone 27 is comprised between 0.3 and 0.4 bars (corresponding to an absolute pressure of 0.7 and, respectively, 0.6 bars).

In this way, it is advantageously possible to minimize possible stratification phenomena of the pre-expanded granules supplied to the loading zone 27 and to distribute in a uniform manner the granules throughout the entire cross section of the loading zone 27 and of the subsequent sintering zone 36 defined in the forming tunnel 18.

In a subsequent step of the method, a continuous slab 2 made of expanded plastic material is formed by subjecting to expansion and mutual welding the granules loaded into the sintering zone 36 of the forming tunnel 18 extending downstream of the loading zone 27.

Advantageously, this step of expansion and mutual welding (or sintering) of the granules is carried out by delivering a hot expanding fluid (for example an air/vapor mixture) through both the gas permeable conveyor belts 21, 22 along the whole sintering section 36 defined in the forming tunnel 18.

Preferably and when the expanded plastic material is expanded polystyrene, the vapor serving as the hot expanding fluid of the granules is supplied at a pressure comprised between 1 and 1.6 absolute bars, for example preferably equal to about 1.2 absolute bars, and at a temperature comprised between 100° C. and 120° C., for example preferably equal to about 100° C.

In the preferred configuration of the forming apparatus 1 illustrated in FIG. 14, the forming step of the continuous slab 2 comprises subjecting the mass of granules under expansion and mutual welding to a progressively decreasing pressure for at least an initial portion of the sintering zone 36 defined between the box-shaped elements 31 and 33 of the sintering section 16 and then to a progressively increasing pressure in at least a second portion of the sintering zone 36 defined between the box-shaped elements 32 and 34 of the sintering section 16 arranged downstream of the preceding one along the moving direction of the continuous slab 2 being formed indicated by the arrow F.

Advantageously, the progressive decrease of the pressure exerted onto the continuous slab 2 being formed allows to obtain an optimal expansion of the granules made of expandable plastic material exploiting to the maximum extent—under the same operating conditions—the expanding capacity of the expanding agent (pentane) included in the granules, while the subsequent progressive increase of the pressure exerted onto the continuous slab 2 allows to obtain:

an optimal mutual welding of the granules in a final stage of the sintering step thereby attaining homogeneous density characteristics and a homogeneous coefficient of heat conductivity;

a reduction—under the same operating conditions—of the amount of expanding agent (pentane) required to obtain the desired final shape, which amount can be as low as 2-4% by weight based on the total weight of the granules, a reduction that allows in turn to reduce the environmental impact of the forming operations, the costs of raw material and the production costs.

In the preferred configuration of the forming apparatus 1 illustrated in FIG. 14, the initial decrease of the pressure exerted on the continuous slab 2 is mechanically obtained by tilting downwards the box-shaped element 31 and by tilting upwards the facing box-shaped element 33, according to a symmetric configuration preferably defining a camber f corresponding to an angle of about 1-4°.

In the preferred configuration of FIG. 13, the subsequent initial increase of the pressure exerted onto the continuous element 2 is mechanically obtained by tilting upwards the box-shaped element 32 and by tilting downwards the facing box-shaped element 34 by means of the angular adjusting device 41, according to a symmetric configuration preferably defining the aforementioned camber f corresponding to an angle of 1-4°.

According to the preferred embodiment described herein, this tilting of the box-shaped elements is obtained by means of the displacing devices 131, 132 of the angular adjusting devices 40, 41 acting on the facing free ends of these elements and can be advantageously adjusted during the forming operations thanks to the intervention of the load cell 87 as a function of the thrust forces detected by the cell during such operations.

In this way, it is advantageously possible to vary in an automatic manner the configuration of the sintering section 16 so as to optimize the sintering and forming conditions of the continuous element made of expanded plastic material.

In order to adjust in an optimal manner the expansion and the mutual welding of the granules made of expandable plastic material, it is also possible to intervene on the pressure exerted on the continuous slab 2 being formed in a, so as to say, non-mechanical manner by regulating the pressure of the hot expanding fluid (air/vapor mixture) delivered by the delivering elements 35 into the box-shaped elements 31-34 of the sintering section 16.

The method of the invention therefore allows to adjust the net flow of the vapor by adjusting the delivery pressure in the box-shaped elements 31-34, that is, beneath or above each gas permeable conveyor belt 21, 22 between the aforementioned preferred values of 1 and 1.6 absolute bars.

Thus, for example, it is possible to obtain a net compression effect of the granules when the vapor delivered is confined within the sintering zone 36, a net upward flow of vapor, that is, towards the box-shaped elements 33 and 34 when the pressure of the vapor delivered in the box-shaped elements 31 and 32 is greater than the pressure of the vapor delivered into the box-shaped elements 33 and 34 or still a net downward flow of vapor, that is, towards the box-shaped elements 31 and 32, in the opposite situation.

In this case, the value of the pressure difference required to obtain the desired flows can be easily determined by those skilled in the art as a function of the production requirements that need to be met.

In this preferred embodiment, the method of the invention further comprises the step of moving the continuous slab 2 by means of the previously described displacing groups 58 of the gas permeable conveyor belts 21 and 22 arranged in the box-shaped elements 31-34 of the sintering zone 16.

In this case, it is advantageously possible to reduce the traction force which should be exerted on the gas permeable conveyor belt 21 and 22 by the pulling groups 48 and 49 to obtain a regular movement of the continuous slab 2 formed in the forming tunnel 18 by acting at the zone where the continuous slab 2 to be transported is subjected to the greatest pressures and, thus, where the greatest traction force is required to the gas permeable conveyor belts 21, 22.

Thanks to the substantially track-shaped structure of the supporting and displacing belt 59 of the displacing groups 58, furthermore, it is also advantageously possible not only to support in a suitable manner the gas permeable conveyor belts 21, 22, but also to split the displacing force and uniformly distribute the hot expanding fluid throughout the entire transversal extension of the belts.

Advantageously, furthermore, the forming step of the continuous slab 2 is carried out by keeping the sintering zone 36 defined in the forming tunnel 18 substantially closed in a vapor-tight manner.

This advantageous feature is achieved thanks to the gasket sealings 101*a*, 101*b* cooperating with the lateral walls 19, 20 and to the pressing action exerted by the inflatable gaskets 94 and 100 associated to the supporting arms 92 and 97.

In this way, it is advantageously possible both to prevent an unwanted release into the external environment of the hot expanding fluid thereby exploiting its heat in an optimal manner, and to drastically reduce a possible release into the environment of the expanding agent, facilitating the collection and disposal operations of the same.

In an alternative embodiment, it is also possible to provide a delivery of the hot expanding fluid through only one of the gas permeable conveyor belts 21, 22, for example and preferably through the lower gas permeable conveyor belt 21, that is, beneath the continuous slab 2 being sintered, so as to confine possible condensates in the lower part of the forming tunnel 18 thereby facilitating their subsequent removal.

In a subsequent step, the method of the invention provides for the step of stabilizing the continuous slab 2 made of expanded plastic material in the stabilizing zone 119 extending downstream of the sintering zone 36 and defined in the forming tunnel 18.

According to a preferred embodiment and as illustrated in FIG. 2, the stabilizing step of the continuous slab 2 comprises the sub-steps of:

a) cooling the continuous slab 2 at least an initial portion 119*a* of the stabilizing zone 119 keeping such portion under vacuum, and b) delivering a detaching fluid, for example compressed air, of the continuous slab 2 from the gas permeable conveyor belts 21, 22 at least a second portion 119*b* of the stabilizing zone 119.

Preferably, the aforementioned sub-steps a) and b) are carried out in sequence so as to cool and stabilize the shape of the continuous slab 2 before promoting the detachment thereof from the gas permeable conveyor belts 21 and 22.

Advantageously, the sub-step a) allows to carry out a quick cooling of the continuous slab 2 formed in the sintering zone 36 effectively stabilizing its shape and substantially preventing the formation of a superficial "skin" thanks to a homogeneous cooling of the entire sintered mass made of expanded plastic material.

In this preferred embodiment, the sub-step a) is carried out by applying a predetermined vacuum degree, for example comprised between 0.3 and 0.4 absolute bars in the first portion 119*a* of the stabilizing zone 119 defined in the forming tunnel 18 at the box-shaped elements 71-72 of the lower supporting tracks 23 and at the box-shaped elements 75-76 of the upper supporting track 24, which vacuum degree is obtained by connecting the inner part of the aforementioned box-shaped elements to a vacuum system conventional per se.

In this way, it is possible to extract in an effective manner the residual expanding vapor from the core of the sintered mass made of expanded plastic material thereby preventing the phenomena related to a quicker cooling of the superficial zones and deemed responsible for the formation of the aforementioned "skin".

The sub-step b) is carried out in the second portion 119b of the stabilizing zone 119 defined in the forming tunnel 18 at the box-shaped elements 73-74 of the lower supporting track 23 and at the box-shaped elements 77-78 of the upper supporting track 24 and advantageously allows to promote the detachment of the continuous slab 2 from the gas permeable conveyor belts 21, 22 reducing at the same time the traction forces that the pulling groups 48, 49 should exert on the conveyor belts and on the slab 2 to promote its movement.

As described above, the detaching fluid is preferably compressed air delivered by a suitable delivering system, conventional per se, connected for example to a distribution network of the plant 3'.

In an alternative preferred embodiment, the sub-step a) of cooling the continuous slab 2 keeping at least one portion of the stabilizing zone 119 under vacuum can be carried out in a portion 119a of the stabilizing zone arranged at a predetermined distance from the sintering zone 36.

In this case, a first sub-step c) of consolidating the shape of the slab 2 in the stabilizing zone 119 of the continuous slab 2 is therefore carried out, in which step the slab is subjected neither to heating nor to cooling (except for the inevitable heat dispersions towards the external environment) before the aforementioned sub-step a) of actual cooling of the continuous slab 2 is carried out by extracting the residual vapor according to the procedures described above.

In this alternative preferred embodiment, therefore, the stabilizing step of the continuous slab 2 thus comprises the sub-steps of:
i) consolidating the shape of the continuous slab 2 in a first portion of the stabilizing zone 119 (for example defined in the forming tunnel 18 between the box-shaped element 71 of the lower supporting track 23 and the box-shaped element 75 of the upper supporting track 24),
ii) cooling the continuous slab 2 in a second portion 119a of the stabilizing zone 119 (for example defined in the forming tunnel 18 between the box-shaped element 72 of the lower supporting track 23 and the box-shaped element 76 of the upper supporting track 24), and
iii) detaching the previously cooled continuous slab 2 from the gas permeable conveyor belts 21, 22 in a third portion 119b of the stabilizing zone 119 (for example defined in the forming tunnel 18 between the box-shaped elements 73, 74 of the lower supporting track 23 and the box-shaped elements 77, 78 of the upper supporting tracks 24).

Preferably, the method of the invention is carried out by moving the gas permeable conveyor belts 21 and 22 and thus by moving the continuous slab 2 in the forming tunnel 18 at a speed comprised between 10 and 20 m/min as a function of the thickness of the slab, preferably comprised in turn between 2 and 50 cm.

Preferably, the method of the invention also comprises the step of keeping the gas permeable conveyor belts 21 and 22 under tension by operating on the tensioning devices 52 and 53 acting on the pulling groups 48 and 49.

In this way, it is advantageously possible to transport in a regular manner the element made of expanded plastic material without having an unwanted bending of the gas permeable conveyor belts.

Preferably, furthermore, the forming method of the invention is carried out in such a way that the temperature of the continuous slab 2 in the core of the mass made of expanded plastic material has a value below about 80° C. at the exit from the stabilizing zone 17, that is, at the exit of the forming apparatus 1.

In this way, it is advantageously possible to reduce the shrinkage and shape variation phenomena which might occur during the storage period of the panels 2' obtained from the continuous slab 2.

With reference to the forming apparatus 1 and to the plant 3" described above, a preferred embodiment of a method according to the invention for continuously forming a construction element made of expanded plastic material, for example the panel 2' previously described, will now be illustrated.

In a first part of the method, the continuous slab 2 is continuously formed according to the operating steps described above.

In a subsequent step, the method of the invention for continuously forming the construction element 2' comprises a step of cutting the continuous slab 2 carried out in the cutting section 9 arranged downstream of the apparatus 1 and including the cutting device 10, for example of the hot wire type.

In this way, it is thus possible to obtain a plurality of panels 2' having a predetermined length each of which can be used, for example, as a heat and sound insulating element in an insulation layer of the so-called "jacket" type of the walls of a building, or as a heat and sound insulating element for other types of uses such as for example, for the insulation of truck bodies, fridges, etc.

Additional alternative preferred embodiments of the methods according to the invention carried out when the apparatus 1 has, under steady-state conditions, the configuration of the box-shaped elements 31-34 of the sintering section 16 illustrated in FIGS. 12 and 13 entirely or partially attain the advantageous technical effects described above.

Thus, for example, in the configuration of the box-shaped elements 31-34 of FIG. 13 it is advantageously possible to subject the continuous slab 2 to a uniform compression in a portion of the sintering zone 36 defined between the box-shaped elements 32 and 34 in a mechanical way, by acting in a symmetrical manner on the continuous slab 2 thanks to a progressive decrease of the height of the forming tunnel 18 in the longitudinal direction.

In the configuration of the box-shaped elements 31-34 of FIG. 12 the progressive height decrease of the forming tunnel 18 in the longitudinal direction, on the other hand, is obtained by operating only on the inclination of the upper box-shaped elements 33 and 34.

Advantageously, the method and the apparatus described above allow to produce both a continuous slab 2, and construction elements 2' made of expanded plastic material, for example in the form of discontinuous panels, provided with textured surfaces at the faces 12, 13 formed by means of partial penetration of a superficial portion of the continuous slab 2 into the perforated area of the conveyor belts 21 and 22 during the sintering operations.

Advantageously, the continuous slab 2 and the construction elements 2' obtained therefrom are thus provided with surfaces having superficial finishing characteristics which facilitate the bonding of suitable coating materials, such as for example plaster, gypsum or other similar materials used in the building industry.

The textured surface of the continuous slab 2 and of the construction panel 2' of the invention; also have aesthetic characteristics which enhance their commercial value on the market.

Preferably, the textured surfaces of the continuous slab 2 and of the construction elements 2' comprise a plurality of microreliefs, having a height for example of about 0.5 mm, substantially uniformly distributed throughout the entire extension of such surface, so as to achieve in an optimal manner the technical and aesthetic features described above.

Clearly, those skilled in the art may introduce variants and modifications to the above described invention, in order to satisfy specific and contingent requirements, variants and modifications which fall anyhow within the scope of protection as is defined by the following claims.

The invention claimed is:

1. An Apparatus for continuously forming a continuous element made of expanded plastic material comprising:
    a) a loading section of a mass of granules made of expandable plastic material;
    b) a sintering section of said continuous element made of expanded plastic material, extending downstream of said loading section;
    c) a stabilizing section of said continuous element made of expanded plastic material, extending downstream of said sintering section;
    d) a forming tunnel extending along said sintering and stabilizing sections and defined between a pair of lateral walls and a pair of gas permeable conveyor belts, respectively lower and upper, said belts being supported by respective lower and upper supporting tracks;
    wherein at least one of the supporting tracks of the gas permeable conveyor belts comprises at least two angularly tiltable portions of at least two box-shaped elements in the sintering section, each box-shaped element being structurally independent and angularly tiltable with respect to a transversal centerline plane of the forming tunnel for varying a height of the forming tunnel in the longitudinal direction;
    wherein each of the lower and upper supporting tracks of the gas permeable conveyor belts comprises a respective displacing group for each of the lower conveyor belt and the upper conveyor belt, wherein each displacing group being arranged at the sintering section; and
    wherein each of said respective displacing groups of the lower and upper gas permeable conveyor belts comprises a supporting and displacing belt forming a movable and gas permeable wall cooperating with a respective lower and upper gas permeable conveyor belt, said supporting and displacing belts of the displacing groups being substantially translationally integral with the respective lower and upper gas permeable conveyor belt.

2. The apparatus according to claim 1, wherein said at least two box-shaped elements of the sintering section are angularly tiltable and said tiltable portions of said at least two box-shaped element are constituted by a wall of said at least two box-shaped elements cooperating with one of said gas permeable conveyor belts.

3. The apparatus according to claim 1, further comprising a delivering element for delivering a hot fluid for expanding the granules made of expandable plastic material arranged at the sintering section.

4. The apparatus according to claim 1, wherein said at least two box-shaped elements are at least two structurally independent box-shaped elements arranged in said sintering section and aligned along said forming tunnel, each of said box-shaped elements being angularly tiltable with respect to the transversal centerline plane of said tunnel for varying the height of the tunnel in the longitudinal direction.

5. The apparatus according to claim 1, wherein each of said lower and upper supporting tracks of the gas permeable conveyor belts comprises at least a pair of structurally independent box-shaped elements arranged in the sintering section and aligned along the forming tunnel.

6. The apparatus according to claim 5, wherein at least two box-shaped elements of the lower supporting track and at least two box-shaped elements of the upper supporting track are angularly tiltable with respect to the transversal centerline plane of the forming tunnel for varying the height of the tunnel in the longitudinal direction.

7. The apparatus according to claim 5, wherein the box-shaped elements of the lower and upper supporting tracks of the gas permeable conveyor belts arranged in the sintering section are symmetrically arranged with respect to the transversal centerline plane of the forming tunnel.

8. The apparatus according to claim 5, wherein the box-shaped elements arranged in the sintering section comprise a sliding block for supporting each of the respective gas permeable conveyor belt arranged at at least one longitudinal end of said at least two box-shaped elements.

9. The apparatus according to claim 2, wherein said at least two box-shaped elements are angularly tiltable with respect to the transversal centerline plane of the forming tunnel by means of an angular adjusting device cooperating with a longitudinal end of said at least one box-shaped element.

10. The apparatus according to claim 9, wherein said angular adjusting device is provided with a sensor adapted to detect thrust forces generated in the sintering section upon expansion of the granules made of expandable plastic material and to drive in a vertical direction a displacing device of longitudinal end of said at least two box-shaped elements.

11. The apparatus according to claim 1, wherein at least one of said gas permeable conveyor belts is constituted by a gas permeable flexible element.

12. The apparatus according to claim 11, wherein said gas permeable flexible element has a perforated area comprised between 8% and 20% of its total area.

13. The apparatus according to claim 1, wherein each of said supporting and displacing belt is substantially a track type.

14. The apparatus for continuously forming said continuous element according to claim 1, further comprising:
    a plant having a section for feeding a mass of granules made of expandable plastic material.

15. The apparatus for continuously forming a continuous element made of expanded plastic material according to claim 1, further comprising:
    a plant having a feeding section disposed to feed a mass of granules made of expandable plastic material, said feeding section being upstream of said forming apparatus; and
    a cutting section disposed to cut said continuous element made of expanded plastic material, said cutting section being arranged downstream of said apparatus.

16. The apparatus according to claim 13, wherein each of said supporting and displacing belt is operated by a respective motor group with an interposition of a kinematic motion transmission.

17. The apparatus according to claim 13, wherein each of said supporting and displacing belt comprises a plurality of rectangular segments hooked to each other and defining therebetween a plurality of spaces adapted to allow a passage of fluid.

18. The apparatus according to claim 11, wherein said at least one of said gas permeable conveyor belts is constituted by a net of synthetic material or a woven fabric.

19. The apparatus according to claim 18, wherein said at least one of said gas permeable conveyor belts is constituted by a flexible fabric made of a polyester fabric modified in weft and yarn and highly resistant to hydrolysis.

20. The apparatus according to claim 18, wherein said at least one of said gas permeable conveyor belts has a perforated area distributed in a homogeneous manner throughout an entire surface extension thereof and is configured to form a jointless closed loop.

\* \* \* \* \*